(12) United States Patent
Tanimoto

(10) Patent No.: US 8,321,575 B2
(45) Date of Patent: *Nov. 27, 2012

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 495 days.

This patent is subject to a terminal disclaimer.

(21) Appl. No.: 12/335,661

(22) Filed: Dec. 16, 2008

(65) Prior Publication Data

US 2009/0172166 A1 Jul. 2, 2009

(30) Foreign Application Priority Data

Dec. 27, 2007 (JP) ................................ 2007-338072

(51) Int. Cl.
*G06F 15/16* (2006.01)
*G06F 15/173* (2006.01)
*H04L 12/66* (2006.01)
*H04L 12/28* (2006.01)
*H04L 12/56* (2006.01)

(52) U.S. Cl. ........ 709/229; 709/217; 709/225; 709/227; 370/352; 370/389; 370/401

(58) Field of Classification Search .................. 709/203, 709/206, 217, 225, 229, 230, 238, 246; 370/352, 370/389, 401

See application file for complete search history.

(56) References Cited

U.S. PATENT DOCUMENTS

| | | | |
|---|---|---|---|
| 6,574,656 B1 | 6/2003 | Nagaoka et al. | |
| 6,650,631 B1 * | 11/2003 | Benash et al. | ................. 370/352 |
| 6,898,641 B1 | 5/2005 | Kobayashi | |
| 6,988,199 B2 | 1/2006 | Toh et al. | |
| 7,139,811 B2 | 11/2006 | Lev Ran et al. | |
| 7,174,378 B2 | 2/2007 | Yoon et al. | |

(Continued)

FOREIGN PATENT DOCUMENTS

EP 1 942 634 A1 7/2008

(Continued)

OTHER PUBLICATIONS

Traversat et al.: "Project JXTA 2.0 Super-Peer Virtual Network," XP-002481407; http://research.sun.com/spotlight/misc/jxta.pdf>; May 25, 2003; pp. 1-20.

(Continued)

*Primary Examiner* — David Lazaro
*Assistant Examiner* — Vitali Korobov
(74) *Attorney, Agent, or Firm* — Keating & Bennett, LLP

(57) ABSTRACT

A relay server can collectively copy a plurality of shared resources separately held by client terminals to a terminal that belongs to the relay server by performing a simple operation. The relay server includes a shared resource information registration unit. The shared resource information registration unit stores shared resource information when a resource is shared among a plurality of client terminals. The shared resource information includes resource information, hierarchical structure information regarding a hierarchical structure of the resources, and account information of a resource sharing terminal that is a client terminal that shares the resource. When the shared resource information is specified by the resource sharing terminal such that the resource included in the prescribed shared resource information may be output to an output destination in accordance with the hierarchical structure information, the relay server transfers the resource that is included in the specified shared resource information and that can be handled by another resource sharing terminal to the resource sharing terminal.

12 Claims, 17 Drawing Sheets

U.S. PATENT DOCUMENTS

| | | | |
|---|---|---|---|
| 7,412,489 B2* | 8/2008 | Nowacki et al. | 709/206 |
| 7,574,523 B2* | 8/2009 | Traversat et al. | 709/238 |
| 7,647,388 B2 | 1/2010 | Kato | |
| 7,701,954 B2* | 4/2010 | Rabenko et al. | 370/401 |
| 7,774,495 B2* | 8/2010 | Pabla et al. | 709/238 |
| 8,065,418 B1 | 11/2011 | Abuan et al. | |
| 2001/0047414 A1 | 11/2001 | Yoon et al. | |
| 2002/0059436 A1 | 5/2002 | Kubo | |
| 2002/0118398 A1 | 8/2002 | Tanimoto | |
| 2002/0143855 A1* | 10/2002 | Traversat et al. | 709/202 |
| 2002/0143956 A1 | 10/2002 | Tanimoto | |
| 2002/0143960 A1 | 10/2002 | Goren et al. | |
| 2002/0146002 A1 | 10/2002 | Sato | |
| 2002/0152299 A1* | 10/2002 | Traversat et al. | 709/223 |
| 2003/0144872 A1 | 7/2003 | Masui et al. | |
| 2004/0078426 A1 | 4/2004 | Nagami et al. | |
| 2004/0083385 A1 | 4/2004 | Ahmed et al. | |
| 2004/0148432 A1 | 7/2004 | Udono et al. | |
| 2004/0162871 A1* | 8/2004 | Pabla et al. | 709/201 |
| 2004/0172395 A1 | 9/2004 | Edelstein et al. | |
| 2004/0255048 A1 | 12/2004 | Lev Ran et al. | |
| 2005/0076098 A1 | 4/2005 | Matsubara et al. | |
| 2006/0083171 A1 | 4/2006 | Tanaike et al. | |
| 2006/0256771 A1 | 11/2006 | Yarlagadda | |
| 2006/0282540 A1 | 12/2006 | Tanimoto | |
| 2007/0022477 A1 | 1/2007 | Larson | |
| 2007/0233844 A1 | 10/2007 | Tanimoto | |
| 2007/0274329 A1 | 11/2007 | Takeyoshi et al. | |
| 2008/0089349 A1 | 4/2008 | Tanimoto | |
| 2008/0098088 A1 | 4/2008 | Tamano et al. | |
| 2008/0137672 A1 | 6/2008 | Tanimoto | |
| 2008/0288591 A1 | 11/2008 | Tanimoto | |
| 2008/0298367 A1 | 12/2008 | Furukawa | |

FOREIGN PATENT DOCUMENTS

| | | |
|---|---|---|
| JP | 04-105143 A | 4/1992 |
| JP | 09-168055 A | 6/1997 |
| JP | 09-282216 A | 10/1997 |
| JP | 2000-059465 A | 2/2000 |
| JP | 2001-092702 A | 4/2001 |
| JP | 2001-292167 A | 10/2001 |
| JP | 2001-306382 A | 11/2001 |
| JP | 2002-007182 A | 1/2002 |
| JP | 2002-149519 A | 5/2002 |
| JP | 2002-199150 A | 7/2002 |
| JP | 2002-217938 A | 8/2002 |
| JP | 2002-217943 A | 8/2002 |
| JP | 2002-247036 A | 8/2002 |
| JP | 2002-288415 A | 10/2002 |
| JP | 2002-314573 A | 10/2002 |
| JP | 2003-006032 A | 1/2003 |
| JP | 2003-032310 A | 1/2003 |
| JP | 2004-139291 A | 5/2004 |
| JP | 2004-201255 A | 7/2004 |
| JP | 2004-265415 A | 9/2004 |
| JP | 2004-310371 A | 11/2004 |
| JP | 2005-027040 A | 1/2005 |
| JP | 2005-086520 A | 3/2005 |
| JP | 2005-115943 A | 4/2005 |
| JP | 2005-267658 A | 9/2005 |
| JP | 2005-328239 A | 11/2005 |
| JP | 2006-033105 A | 2/2006 |
| JP | 2006-268138 A | 10/2006 |
| JP | 2006-343943 A | 12/2006 |
| JP | 2007-104440 A | 4/2007 |
| JP | 2007-265135 A | 10/2007 |
| JP | 2007-267136 A | 10/2007 |
| JP | 2008-098699 A | 4/2008 |
| JP | 2008-098888 A | 4/2008 |
| JP | 2008-148046 A | 6/2008 |
| JP | 2008-148125 A | 6/2008 |
| JP | 2008-148200 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| JP | 2010-178089 A | 8/2010 |
| JP | 2011-055452 A | 3/2011 |
| JP | 2011-055453 A | 3/2011 |
| JP | 2011-055454 A | 3/2011 |
| WO | 03/012578 A2 | 2/2003 |
| WO | 2006/090465 A1 | 8/2006 |

OTHER PUBLICATIONS

Official communication issued in counterpart European Application No. 08021944.7, mailed on Feb. 23, 2009.

Tanimoto: "Relay Server and Relay Communication System," U.S. Appl. No. 12/340,868, filed Dec. 22, 2008.

Official Communication issued in corresponding Japanese Patent Application No. 2007-338072, mailed on Oct. 19, 2009.

Shinji Okumura et al., SIP (session initiation protocol), Nikkei Communications, Sep. 22, 2003, pp. 150-158 (partial translation pp. 155-156 (Usable in IM and Presence Notification)).

Tanimoto; "Relay-Server"; U.S. Appl. No. 11/853,943, filed Sep. 12, 2007.

Tanimoto; "File Server Device"; U.S. Appl. No. 11/862,654, filed Sep. 27, 2007.

Tanimoto; "File Transfer Server"; U.S. Appl. No. 11/870,622, filed Oct. 11, 2007.

Tanimoto; "Relay Server, Relay Communication System, and Communication Device"; U.S. Appl. No. 11/944,495, filed Nov. 23, 2007.

Tanimoto; "Relay Server and Relay Communication System"; U.S. Appl. No. 11/953,505, filed Dec. 10, 2007.

Tanimoto; "Relay Server and Client Terminal"; U.S. Appl. No. 11/953,351, filed Dec. 10, 2007.

Tanimoto; "Relay Server and Relay Communication System"; U.S. Appl. No. 12/103,933, filed Apr. 16, 2008.

Tanimoto; "Relay Server and Relay Communication System"; U.S. Appl. No. 12/112,127, filed Apr. 30, 2008.

Tanimoto; "Relay Server and Relay Communication System"; U.S. Appl. No. 12/107,793, filed Apr. 23, 2008.

Tanimoto; "Relay Server and Relay Communication System"; U.S. Appl. No. 12/270,883, filed Nov. 14, 2008.

Tanimoto; "Relay Server and Relay Communication System"; U.S. Appl. No. 12/335,642, filed Dec. 16, 2008.

Official Communication issued in U.S. Appl. No. 11/723,466, mailed on Nov. 8, 2010.

Tanimoto; "Relay Device and Communication System"; U.S. Appl. No. 11/723,466, filed Mar. 20, 2007.

Official Communication issued in corresponding Japanese Patent Application No. 2006-335512, mailed on Aug. 2, 2011.

Official Communication issued in corresponding Japanese Patent Application No. 2006-090693, mailed on Aug. 2, 2011.

Official Communication issued in corresponding Japanese Patent Application No. 2009-205183, mailed on Feb. 3, 2012.

Official Communication issued in corresponding Japanese Patent Application No. 2009-205191, mailed on Feb. 3, 2012.

Official Communication issued in corresponding Japanese Patent Application No. 2009-201775, mailed on Feb. 7, 2012.

Tanimoto, "Relay Device and Communication System", U.S. Appl. No. 13/341,711, filed Dec. 30, 2011.

Official Communication issued in International Patent Application No. PCT/JP2010/001594, mailed on Mar. 30, 2010.

Official Communication issued in International Patent Application No. PCT/JP2010/003240, mailed on Jun. 15, 2010.

Official Communication issued in International Patent Application No. PCT/JP2010/005041, mailed on Nov. 22, 2010.

Official Communication issued in International Patent Application No. PCT/JP2010/005679, mailed on Oct. 26, 2010.

Official Communication issued in International Patent Application No. PCT/JP2010/005680, mailed on Oct. 26, 2010.

Hitoshi, "Network World", vol. 9, No. 12, Dec. 1, 2004, pp. 148-150.

Tanimoto, "Relay Server, Communication System and Facsimile System", U.S. Appl. No. 10/045,698, filed Jan. 10, 2002.

Tanimoto, "Relay Server, Communication System and Facsimile System", U.S. Appl. No. 10/045,897, filed Jan. 10, 2002.

Tanimoto, "Relay Server for Relaying Communications Between Network Devices", U.S. Appl. No. 10/114,720, filed Apr. 1, 2002.

Tanimoto, "Relay Server", U.S. Appl. No. 10/114,963, filed Apr. 2, 2002.

Tanimoto, "Relay Server, Network Device, Communication System, and Communication Method", U.S. Appl. No. 10/116,615, filed Apr. 2, 2002.

Official Communication issued in corresponding Japanese Patent Application No. 2007-339311, mailed on Apr. 8, 2011.

"Error & Warning Message Ways of Coping, Nikkei Personal Computer", Nikkei Business Publications, Inc., May 10, 2007.

Official Communication issued in corresponding European Patent Application No. 08007866.0, mailed on Apr. 19, 2011.

Tanimoto, "Relay Communication System and First Relay Server," U.S. Appl. No. 13/320,034, filed Nov. 11, 2011.

Tanimoto et al., "Relay Communication System and Access Management Apparatus," U.S. Appl. No. 13/390,561, filed Feb. 15, 2012.

Tanimoto, "Relay Server and Relay Communication System," U.S Appl. No. 13/496,664, filed Mar. 16, 2012.

Tanimoto, "First Relay Server and Second Relay Server", U.S. Appl. No. 13/255,958, filed Sep. 12, 2011.

English translation of Official Communication issued in corresponding Japanese Patent Application No. 2006-334652, mailed on Jun. 8, 2010.

English translation of Official Communication issued in corresponding Japanese Patent Application No. 2007-152122, mailed on Jun. 2, 2010.

Tanimoto, "Relay Server and Relay Communication System", U.S. Appl. No. 13/061,234, filed Feb. 28, 2011.

Tanimoto, "Relay Server, Relay Communication System, and Communication Apparatus", U.S. Appl. No. 13/061,725, filed Mar. 2, 2011.

* cited by examiner

FIG. 7

```
<?xml version="1.0" encoding="Shift_JIS" ?>                    — 121
<user-account account="client11@account">                      — 122
  <policy name="workspace1" policy-id="20071001150032client11@relay-server1">   — 123
    <family-account-info>
      <user-account account="client11@relay-server1.net"/>
      <user-account account="client12@relay-server1.net"/>
      <user-account account="client21@relay-server2.net"/>     } 124
      <user-account account="client22@relay-server2.net"/>
      <user-account account="client31@relay-server3.net"/>
    </family-account-info>
    <family-resource-info>
      ......                                                    } 125
    </family-resource-info>
  </policy>
</user-account>
```

120, 123 (callouts)

FIG. 8

```
<family-resource-info>
  <resource name="folderA" owner="client11@relay-server1.net" value="c:/folderA" status="ok">
    <resource name="file00ZX.xls" owner="client11@relay-server1.net" value="//network/z://folderZ/estimate.xls" status="ok" />
    <resource name="file003.cpp" owner="client12@relay-server1.net" value="c:/project1/source.cpp" status="ok" />
  </resource>
  <resource name="folderB" owner="client21@relay-server2.net" value="c:/document" status="ok">
    <resource name="file00A.xls" owner="client21@relay-server2.net" value="c:/document/doc001.xls" status="ok" />
  </resource>
  <resource name="folderC" owner="client31@relay-server3.net" value="c:/temp" status="ok">
    <resource name="file001.pdf" owner="client31@relay-server3.net" value="c:/temp/A0001.pdf" status="ok" />
  </resource>
</family-resource-info>
```

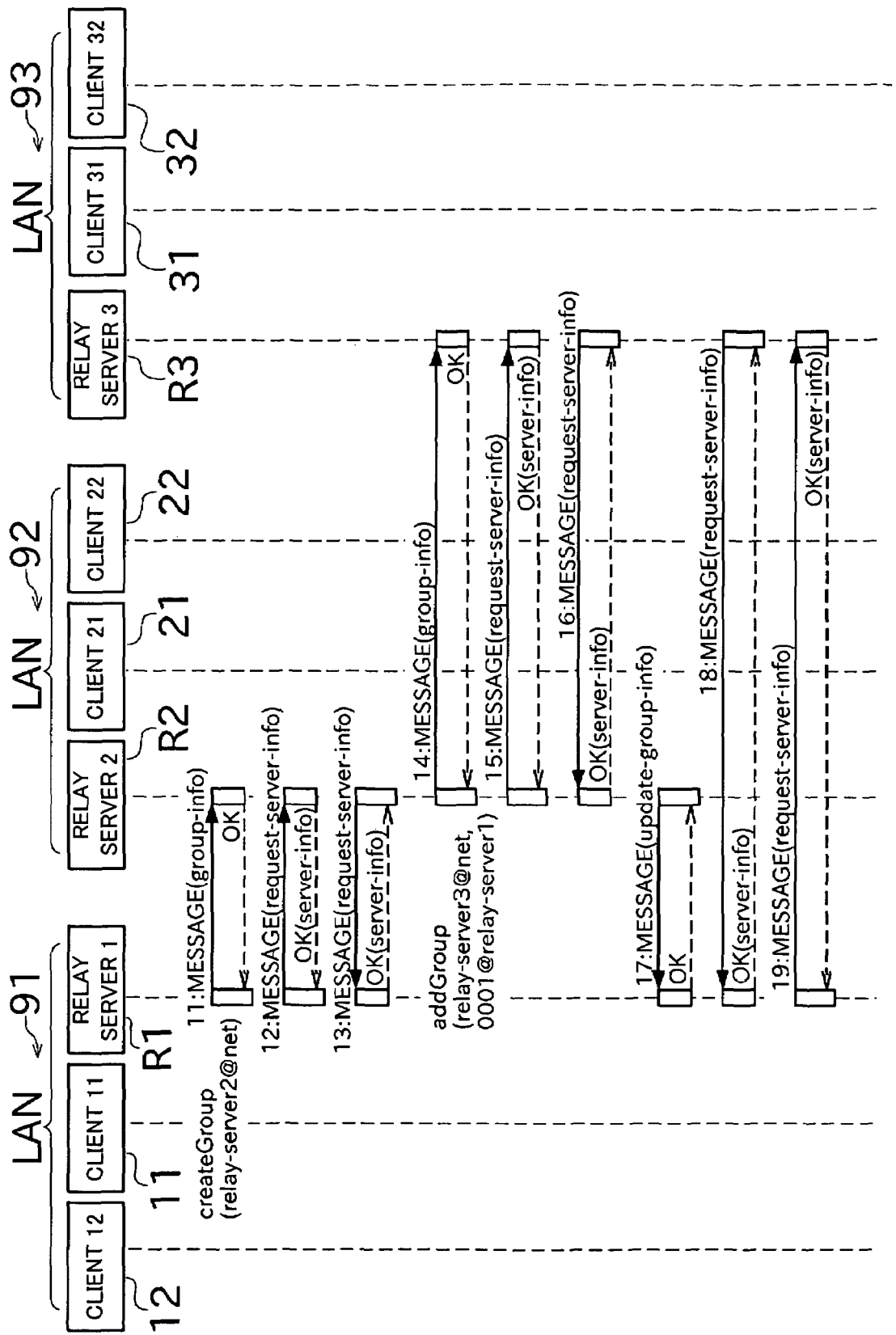

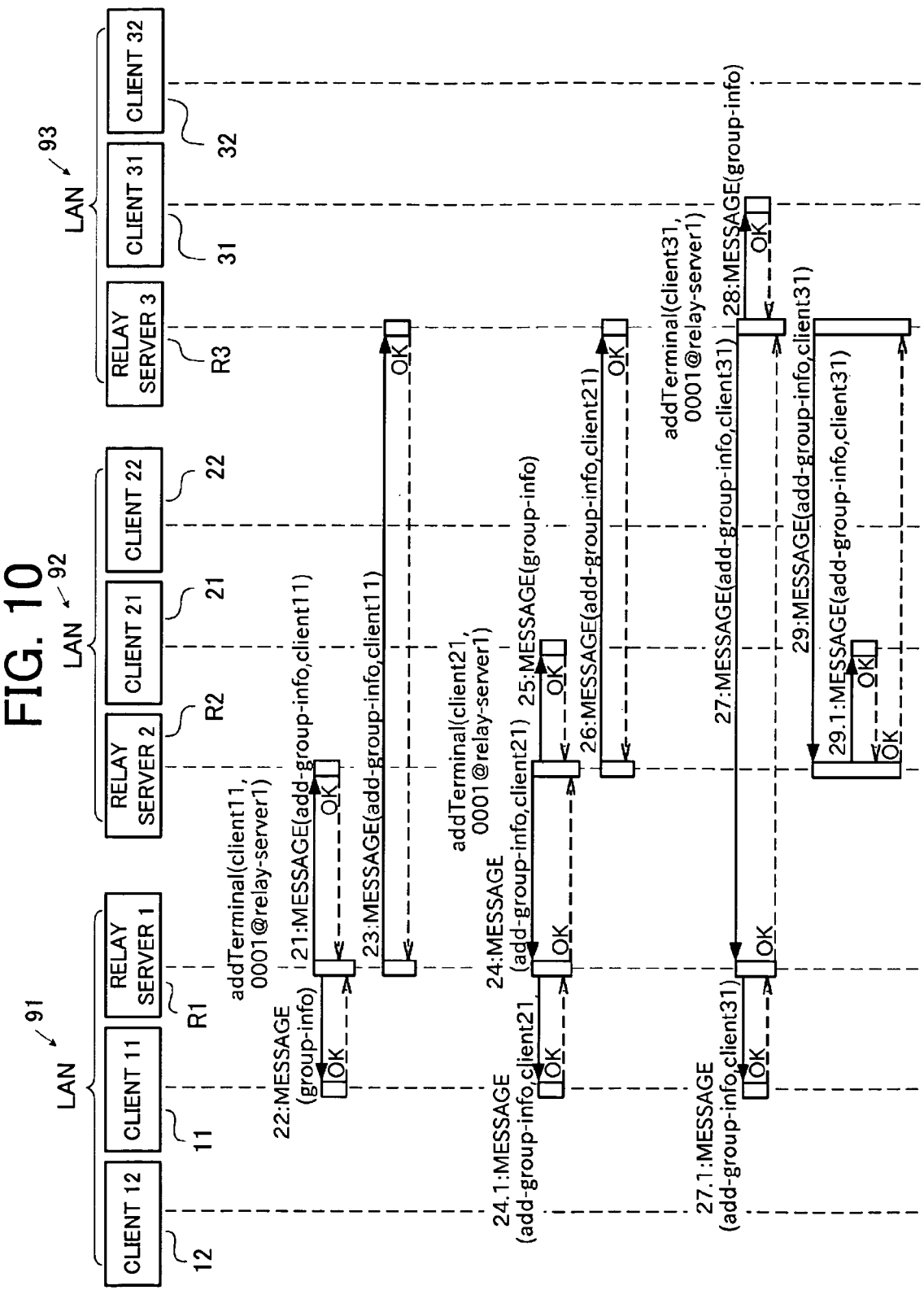

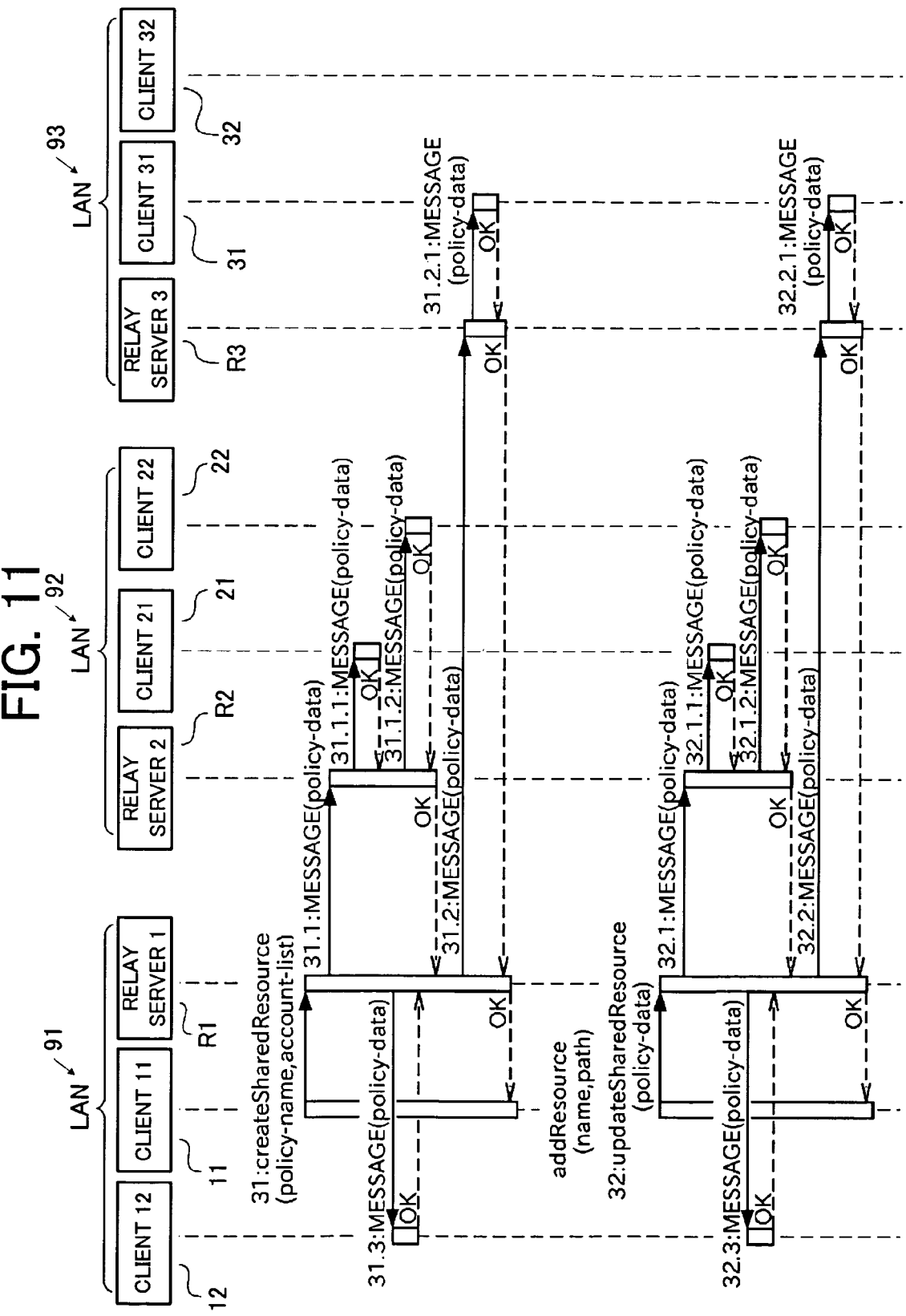

RELAY SERVER AND RELAY COMMUNICATION SYSTEM

CROSS-REFERENCE TO RELATED APPLICATIONS

This application claims priority under 35 U.S.C. 119 to Japanese Patent Application No. 2007-338072, filed on Dec. 27, 2007, which application is hereby incorporated by reference in its entirety.

BACKGROUND OF THE INVENTION

1. Field of the Invention

The present invention relates to a relay server and a relay communication system that enable resource sharing via a network.

2. Description of the Related Art

A communication system referred to as a Virtual Private Network (VPN) is known in the conventional art. The VPN is used, for example, to provide communication over the Internet between terminals connected to a Local Area Network (LAN) of a plurality of branch offices (base points) established in separate regions. Through the use of the VPN, each client terminal can share various resources (such as folders, files, etc.) held by apparatuses connected to another LAN arranged in a remote location.

In the VPN, when a plurality of shared resources are separately stored in different client terminals, it is necessary to perform an operation for copying or replicating the plurality of resources several times so as to store them in a local storage unit, or the like. Accordingly, it has been desired to improve convenience of handling the resources.

SUMMARY OF THE INVENTION

In order to overcome the problems described above, preferred embodiments of the present invention provide a relay server that collectively copies, to a terminal thereof, a plurality of shared resources separately stored in different terminals, by performing a simple operation.

A preferred embodiment of the present invention provides a relay server that includes a relay group information registration unit, a shared resource information registration unit, and a control unit. The relay group information registration unit stores information about a relay group including other relay servers that can be connected to the relay server. The shared resource information registration unit stores shared resource information when a resource is shared by a plurality of client terminals in the relay group. The shared resource information includes resource information, hierarchical structure information regarding a hierarchical structure of the resources, and account information of a resource sharing terminal, which is a client terminal that shares the resource. When the resource sharing terminal specifies the shared resource information in order to output a resource included in the prescribed shared resource information to an output destination in accordance with the hierarchical structure information, the control unit transfers the resource that is included in the specified shared resource information and that can be handled by another resource sharing terminal to the resource sharing terminal.

In the above-described configuration, when a certain client terminal desires to output the resources to an output destination, the resources are transferred to the client terminal via the relay server, and the resources can be collectively copied to the output destination in accordance with the hierarchical structure. Accordingly, even when a plurality of resources are separately stored in a plurality of client terminals, the resources can be easily copied via a network in an organized state in accordance with the hierarchical structure.

In the relay server, it is preferable that the shared resource information includes resource name information and the resource information. The resource sharing terminal can preferably select either a name of the resource described in the shared resource information or a name extracted from the resource information to use when outputting the resource included in the specified shared resource information.

In the above-described configuration, the name of the resource that is copied by the client terminal can be selected, thereby meeting a user's various needs.

In the relay server, it is preferable that, when outputting the resource included in the specified shared resource information, the resource sharing terminal can select whether or not to include, in the resources to be output, the resource that can be handled by the resource sharing terminal.

In the above-described configuration, even when it is not necessary to copy the resource that can be handled by the client terminal that performs the outputting operation, such cases can be appropriately dealt with.

In the relay server, it is preferable that the resource sharing terminal can specify only a portion of the hierarchical structure described in the shared resource information, and then output the resource.

In the above-described configuration, only the necessary portion of the hierarchical structure of the resources can be specified and copied, thereby facilitating the process of copying the resource via the network.

According to another preferred embodiment of the present invention, a relay communication system includes a plurality of relay servers and a plurality of client terminals. The relay server includes a relay group information registration unit, a shared resource information registration unit, and a control unit. The relay group information registration unit stores information about a relay group including other relay servers that can be connected to the relay server. The shared resource information registration unit stores shared resource information when a resource is shared by the plurality of client terminals in the relay group. The shared resource information includes resource information, hierarchical structure information regarding a hierarchical structure of the resources, and account information of a resource sharing terminal, which is a client terminal that shares the resource. When the resource sharing terminal specifies the shared resource information in order to output a resource included in the prescribed shared resource information to an output destination in accordance with the hierarchical structure information, the control unit transfers, to the resource sharing terminal, the resource that is included in the specified shared resource information and that can be handled by another resource sharing terminal.

In the above-described configuration, when a certain client terminal desires to output the resources to an output destination, the resources are transferred to the client terminal via the relay server, and the resources can be collectively copied to the output destination in accordance with the hierarchical structure. Accordingly, even when a plurality of resources are separately stored in a plurality of client terminals, the resources can be easily copied via the network in an organized state in accordance with the hierarchical structure.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 illustrates a content of shared resource information according to a preferred embodiment of the present invention.

FIG. 8 illustrates a detailed content of family resource information of the shared resource information according to a preferred embodiment of the present invention.

FIG. 9 is a sequence chart illustrating a communication process in which a relay group is created according to a preferred embodiment of the present invention.

FIG. 10 is a sequence chart illustrating a communication process in which the client terminal is registered in the relay group as a resource sharable terminal according to a preferred embodiment of the present invention.

FIG. 11 is a sequence chart illustrating a communication process in which a shared resource is registered in the relay group according to a preferred embodiment of the present invention.

DETAILED DESCRIPTION OF PREFERRED EMBODIMENTS

Figure 1:
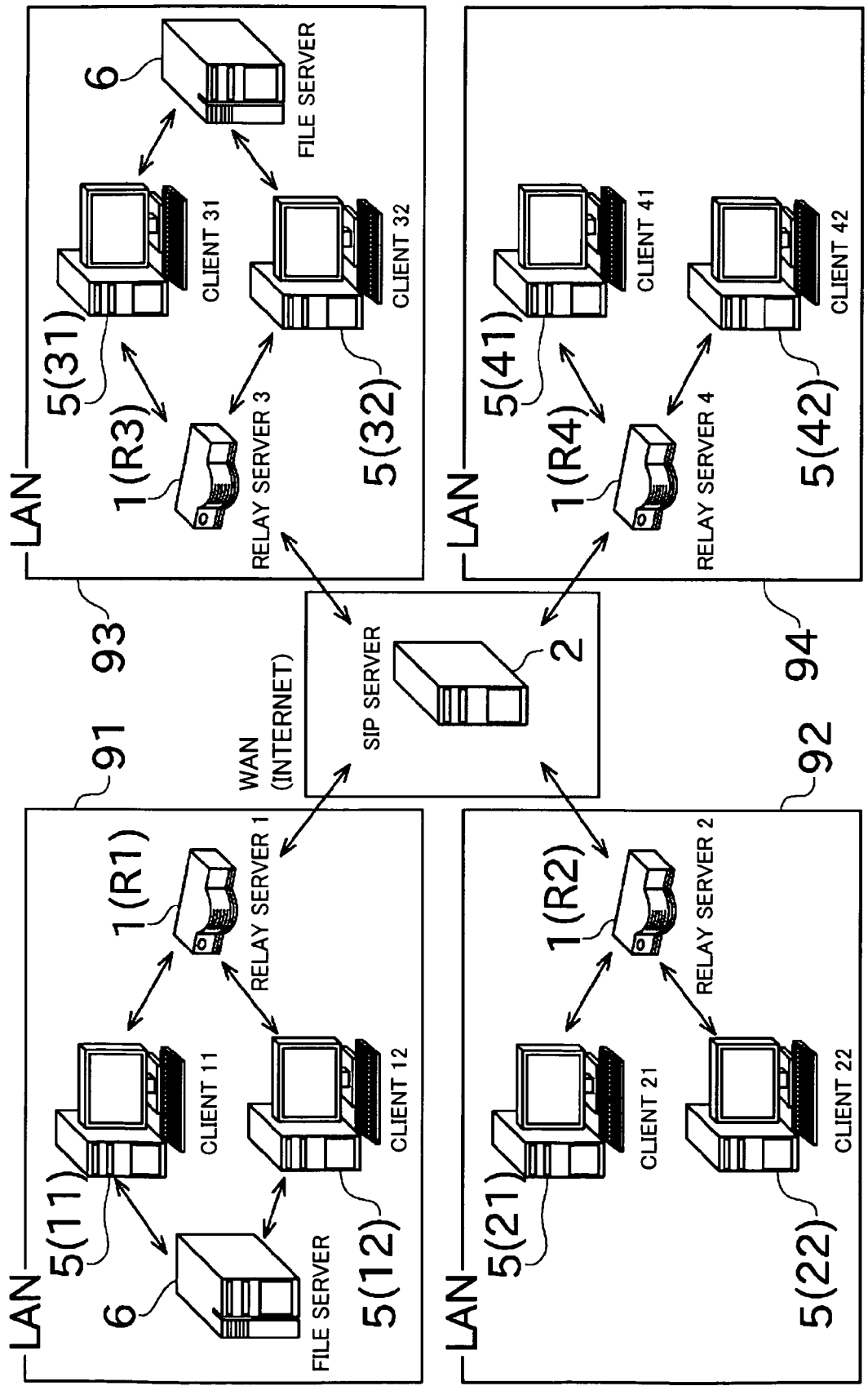
FIG. 1 is a network configuration diagram of a relay communication system according to a preferred embodiment of the present invention.

Preferred embodiments of the present invention will be described with reference to the drawings. FIG. 1 illustrates an overall configuration of a relay communication system according to a preferred embodiment of the present invention.

As illustrated in FIG. 1, the relay communication system of the present preferred embodiment includes a plurality of LANs connected to a Wide Area Network (WAN). The relay communication system includes relay servers 1, an external server 2, client terminals 5, and file servers 6, etc.

The WAN is a network that connects different LANs to each other. In the present preferred embodiment, the Internet is preferably used as the WAN, for example.

The LAN is a relatively small-scale network provided in a limited location. There are a plurality of LANs, each of which is provided at physically remote locations. In the present preferred embodiment, a LAN 91 is provided at, for example, a Tokyo branch office, and LANs 92, 93, 94 are respectively provided at, for example, an Osaka branch office, a Nagoya branch office, and a Fukuoka branch office. The four LANs 91, 92, 93, 94 are respectively connected to the Internet, which is a global network.

Figure 2:
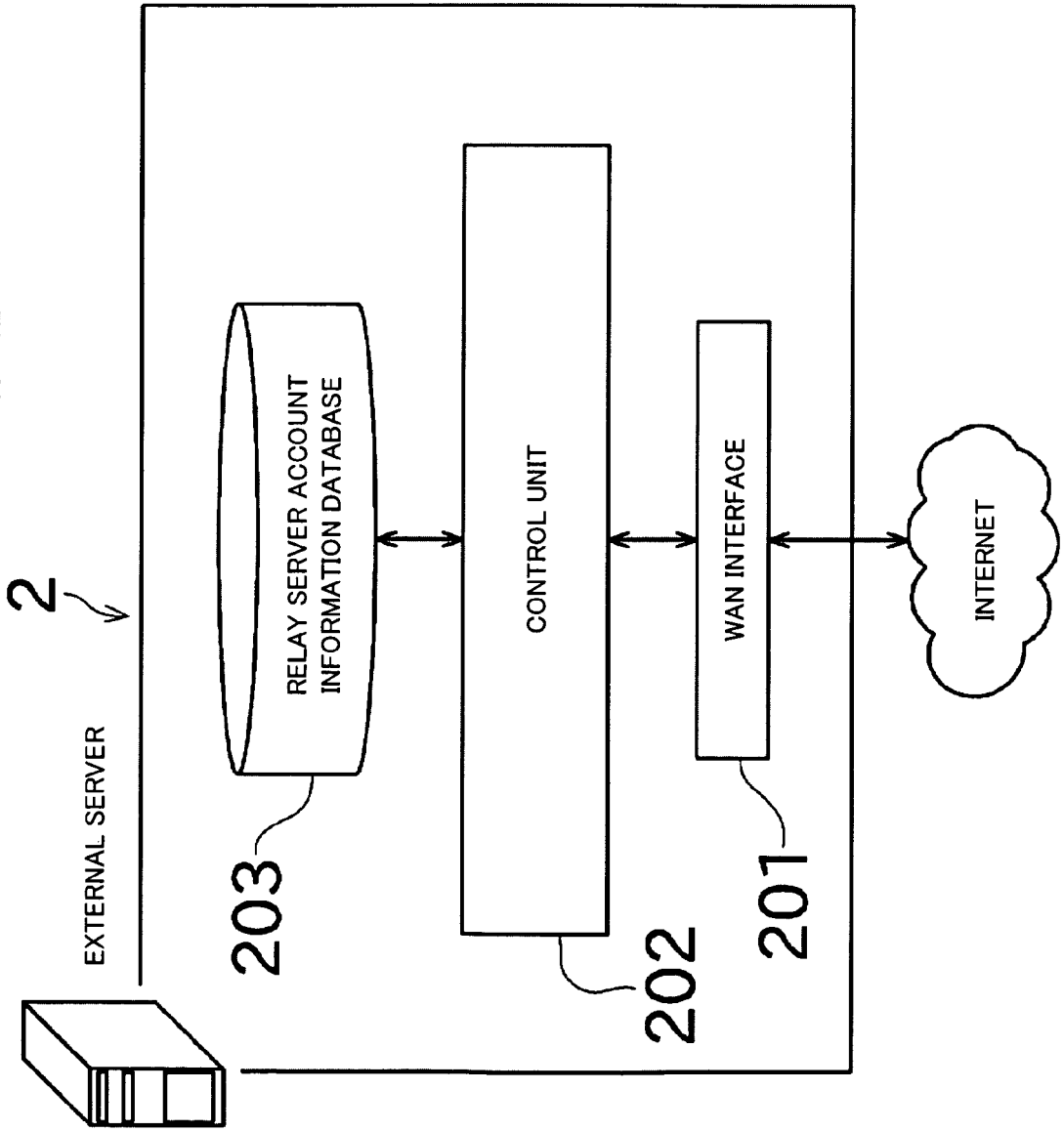
FIG. 2 is a functional block diagram of an external server according to a preferred embodiment of the present invention.

The external server 2 will now be described with reference to FIG. 2, etc. FIG. 2 is a functional block diagram of the external server 2. The external server 2 is a device that facilitates the communication performed between the relay servers 1 each arranged in the respective LANs, and that is provided on the Internet.

The external server 2 illustrated in FIG. 2 functions as a Session Initiation Protocol (SIP) server. Specifically, the external server 2 functions as an SIP proxy server arranged to relay SIP methods and responses, etc., and functions as an SIP registrar server arranged to register an account of the relay server 1.

As illustrated in FIG. 2, the external server 2 preferably includes a WAN interface 201, a control unit 202, and a relay server account information database 203 as a primary configuration.

The WAN interface 201 is an interface arranged to communicate with each apparatus, such as, for example, the relay server 1, connected to the Internet, by using a global IP address.

The relay server account information database 203 is a database that manages, in association with the global IP address, the account of the relay server 1 that has made a registration request.

The control unit 202 is a processing unit that controls various communications performed through the WAN interface 201, and controls communication processes complying with protocols such as, for example, Transmission Control Protocol/Internet Protocol (TCP/IP), User Datagram Protocol (UDP) and SIP. The control unit 202 performs, for example, a process of receiving the account of the relay server 1 from each relay server 1 and a process of registering the received account in the relay server account information database 203. Moreover, the control unit 202 performs, for example, a process of relaying communication data, such as various SIP methods and responses, transmitted from the relay server 1 to other relay servers 1.

The client terminal 5 will now be described with reference to FIG. 3, which is a functional block diagram of the client terminal 5.

The client terminal 5 is a terminal that can be directly operated by a user, and includes a Personal Computer (PC) or other similar devices operated by the user, for example, on a daily basis. Accordingly, a great number of client terminals 5 typically exist in the LAN. In the present preferred embodiment, as illustrated in FIG. 1, client terminals 11, 12 are connected to the LAN 91, client terminals 21, 22 are connected to the LAN 92, client terminals 31, 32 are connected to the LAN 93, and client terminals 41, 42 are connected to the LAN 94. Each client terminal 5 is provided with a private IP address uniquely managed in the same LAN.

Figure 3:
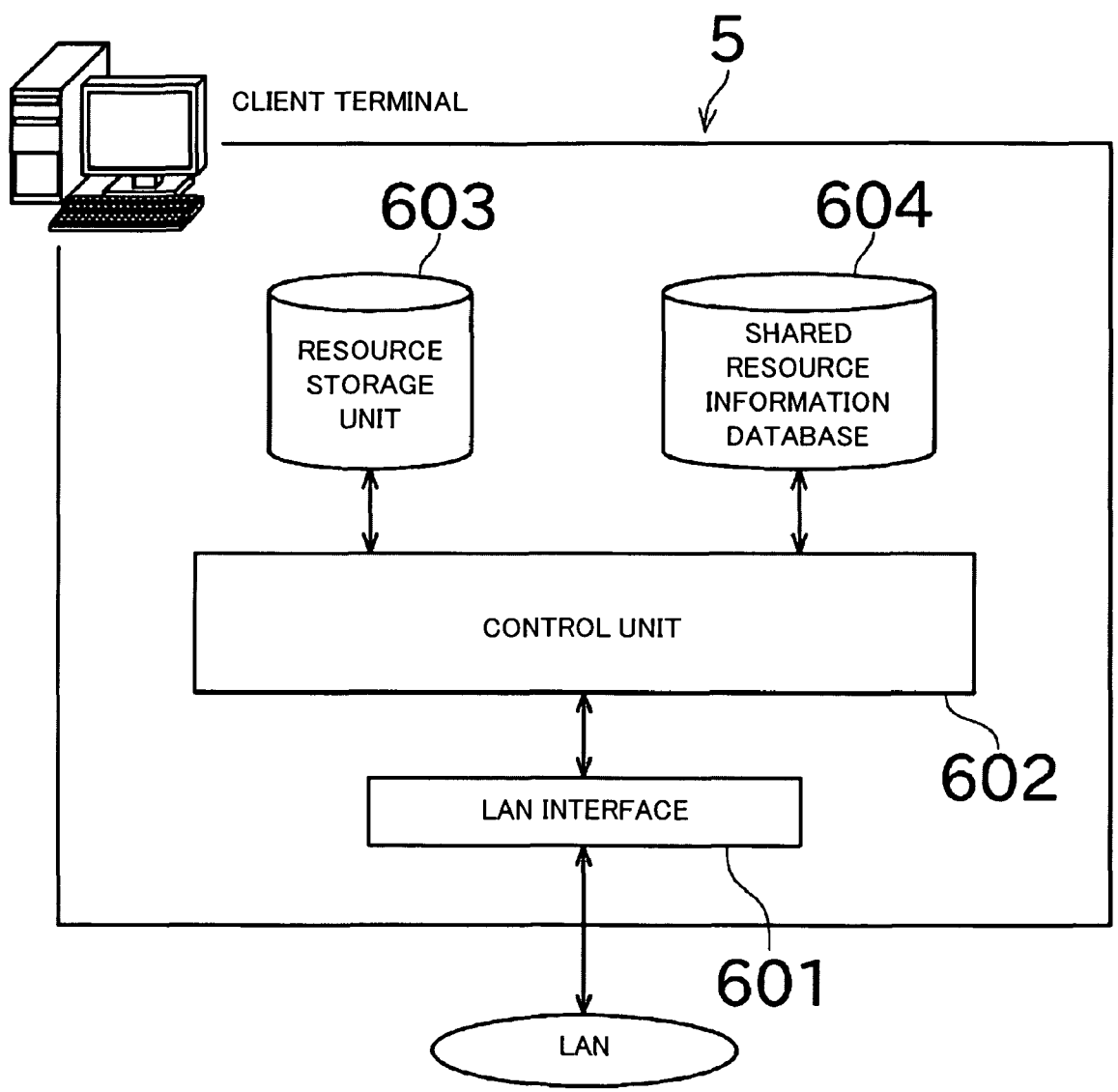
FIG. 3 is a functional block diagram of a client terminal according to a preferred embodiment of the present invention.

As illustrated in FIG. 3, the client terminal 5 preferably includes a LAN interface 601, a control unit 602, a resource storage unit 603, and a shared resource information database 604 as a primary configuration.

The LAN interface 601 is an interface arranged to communicate with each apparatus, such as the relay server 1 and the file server 6 connected to the same LAN, by using the private IP address.

The resource storage unit 603 stores resources, such as files, folders, etc., that can be handled by the client terminal 5.

The shared resource information database 604 stores shared resource information held by each client terminal 5.

The control unit 602 is a processing unit that controls various communications performed through the LAN interface 601. The control unit 602 controls communication processes complying with protocols such as TCP/IP, UDP, and SIP.

The control unit 602 performs, for example, a process of controlling the handling such as movement (transfer), change, deletion, etc., of the resources stored in the resource storage unit 603. The control unit 602 also performs a process of updating the shared resource information stored in the shared resource information database 604 when a change notification of the shared resource information is received from the relay server 1.

The relay server 1 will now be described with reference to FIG. 4, which is a functional block diagram of each relay server 1.

As illustrated in FIG. 1, one relay server 1 is arranged in each LAN. Specifically, a relay server R1 is arranged in the LAN 91, a relay server R2 is arranged in the LAN 92, a relay server R3 is arranged in the LAN 93, and a relay server R4 is arranged in the LAN 94.

The relay server 1 is connected to the LAN, and can communicate with each client terminal 5 that is connected to the same LAN. The relay server 1 is also connected to the Internet, and can communicate (through the external server 2) with the relay servers 1 that are connected to the other LANs. In order to permit such communication, each relay server 1 is provided with both a private IP address and a global IP address.

Figure 4:
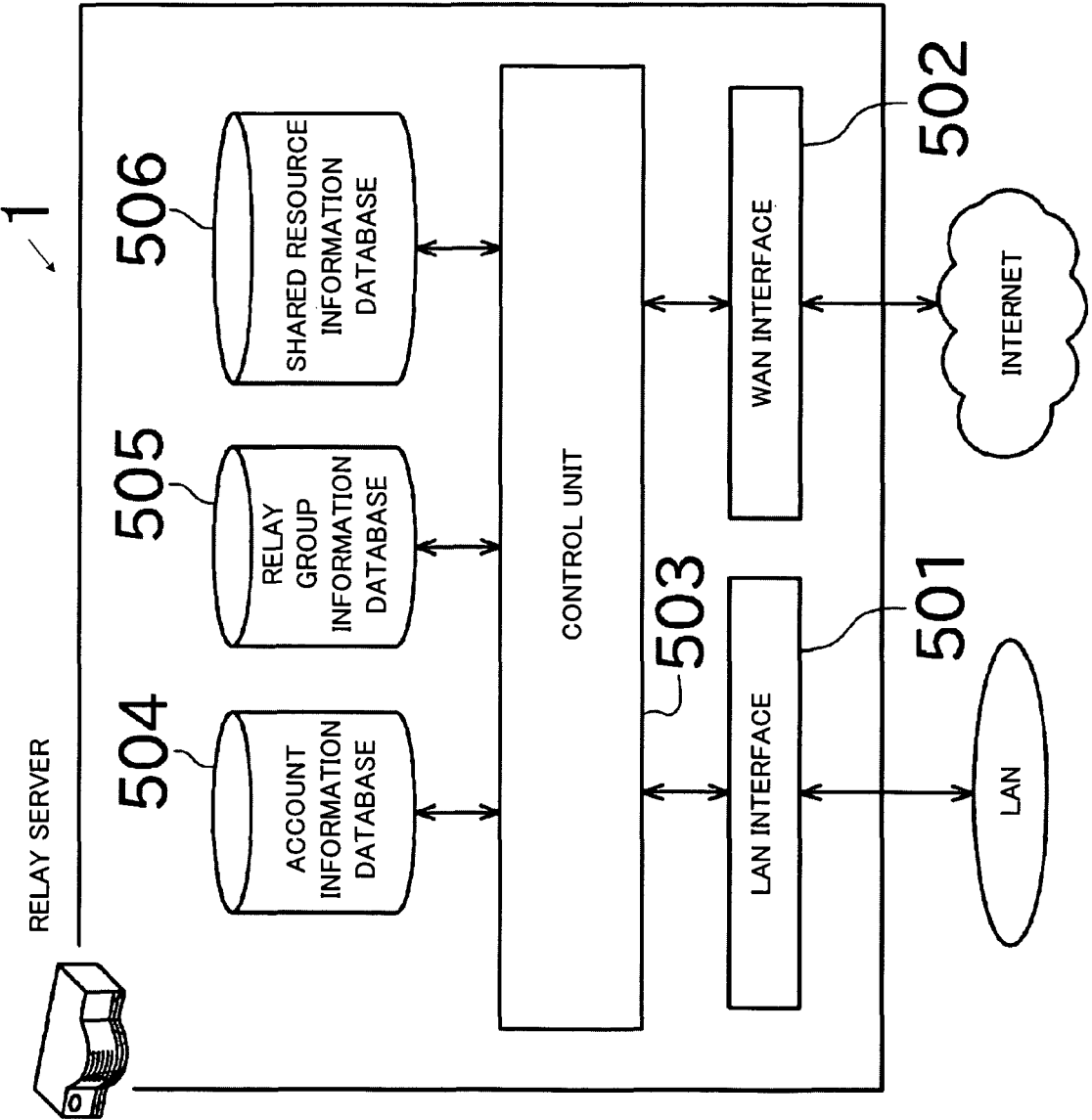
FIG. 4 is a functional block diagram of a relay server according to a preferred embodiment of the present invention.

As illustrated in FIG. 4, a primary configuration of the relay server 1 preferably includes a LAN interface 501, a WAN interface 502, a control unit 503, an account information database 504, a relay group information database 505, and a shared resource information database 506.

The LAN interface 501 is an interface arranged to communicate with the client terminal 5 connected to the same LAN (i.e., the LAN to which the relay server 1 is connected), by using the private IP address. For example, the relay server R1 can communicate with each of the client terminals 11, 12 in the LAN 91 by using the LAN interface 501.

The WAN interface 502 is an interface arranged to communicate with each apparatus such as the external server 2 connected to the Internet, by using the global IP address.

Each relay server 1 includes a function of an SIP registrar server, and communicates with each client terminal 5 by using a SIP. For example, in the LAN 92, the relay server R2 functions as a SIP registrar server, receives an account of each client terminal 21, 22 connected to the LAN 92, and registers the received accounts in the account information database 504.

Figure 5:
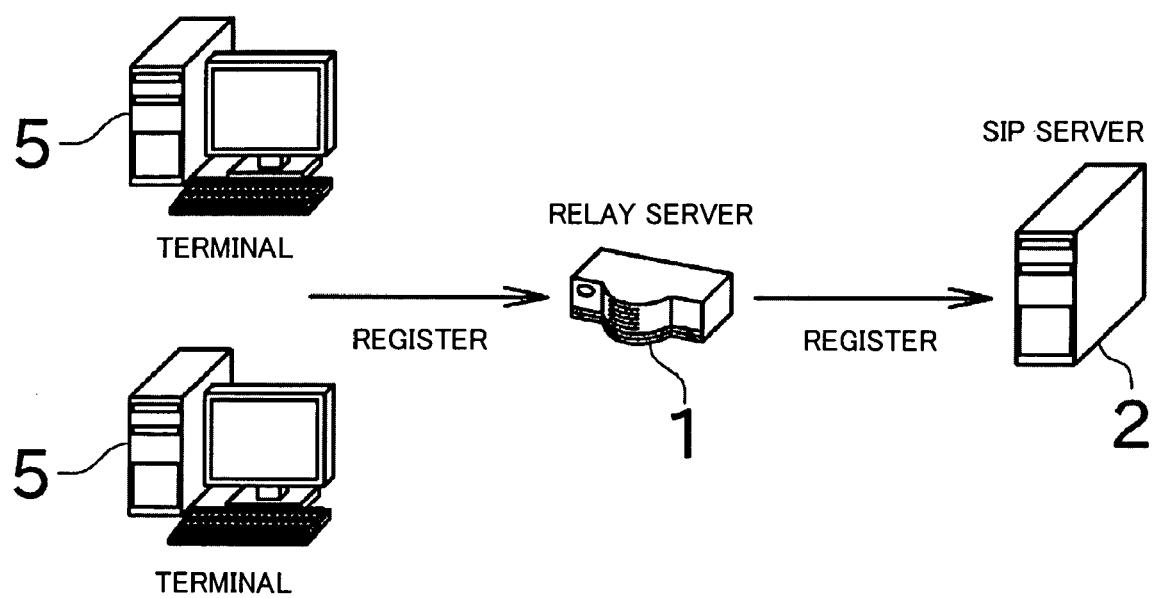
FIG. 5 illustrates the relationship among the client terminal, the relay server, and the external server according to a preferred embodiment of the present invention.

Accordingly, as illustrated in FIG. 5, in the relationship with the client terminal 5, the relay server 1 functions as a server that receives the account from the client terminal 5 and registers (REGISTER) the account. In the relationship with the external server 2, the relay server 1 functions as a client that transmits the account to the external server 2 and registers (REGISTER) the account.

The account information database 504 of FIG. 4 is a database that manages, in association with the private IP address, the account of the client terminal 5 that has made a registration request.

The relay group information database (relay group information registration unit) 505 is preferably a database that manages relay group information related to the client terminal 5 registered in the account information database 504.

The shared resource information database (shared resource information registration unit) 506 is preferably a database that manages the shared resource information related to the client terminal 5 registered in the account information database 504.

The control unit 503 is preferably a processing unit that controls various communications performed through the LAN interface 501 and the WAN interface 502, and controls various communication processes complying with protocols such as TCP/IP, UDP, SIP, etc.

For example, the control unit 503 performs a process of transmitting an account thereof to the external server 2 and requesting for registration of the account, and a process of creating the relay group information to store in the relay group information database 505. The control unit 503 also performs a process of creating the shared resource information to store in the shared resource information database 506.

The file server 6 will now be described. As illustrated in FIG. 1, the file server 6 is connected to the LAN, and can communicate with each client terminal 5 connected to the same LAN.

The file server 6 can store resources such as files, folders, etc., and functions as a resource storage unit alternative to the resource storage unit 603 (shown in FIG. 3) of each client terminal 5. In other words, in the present preferred embodiment, the resource that can be handled by each client terminal 5 may be stored in a local disc of the corresponding client terminal 5 and/or in the file server 6 provided as a network drive. The file server 6 is not necessarily required in each LAN, and the installation thereof is omitted in the LANs 92 and 94 (shown in FIG. 1).

The relay group information and the shared resource information, which are information handled in the relay communication system of the present preferred embodiment, will now be described.

First, the relay group information will be described with reference to FIG. 6, which illustrates an example of content of the relay group information.

Figure 6:
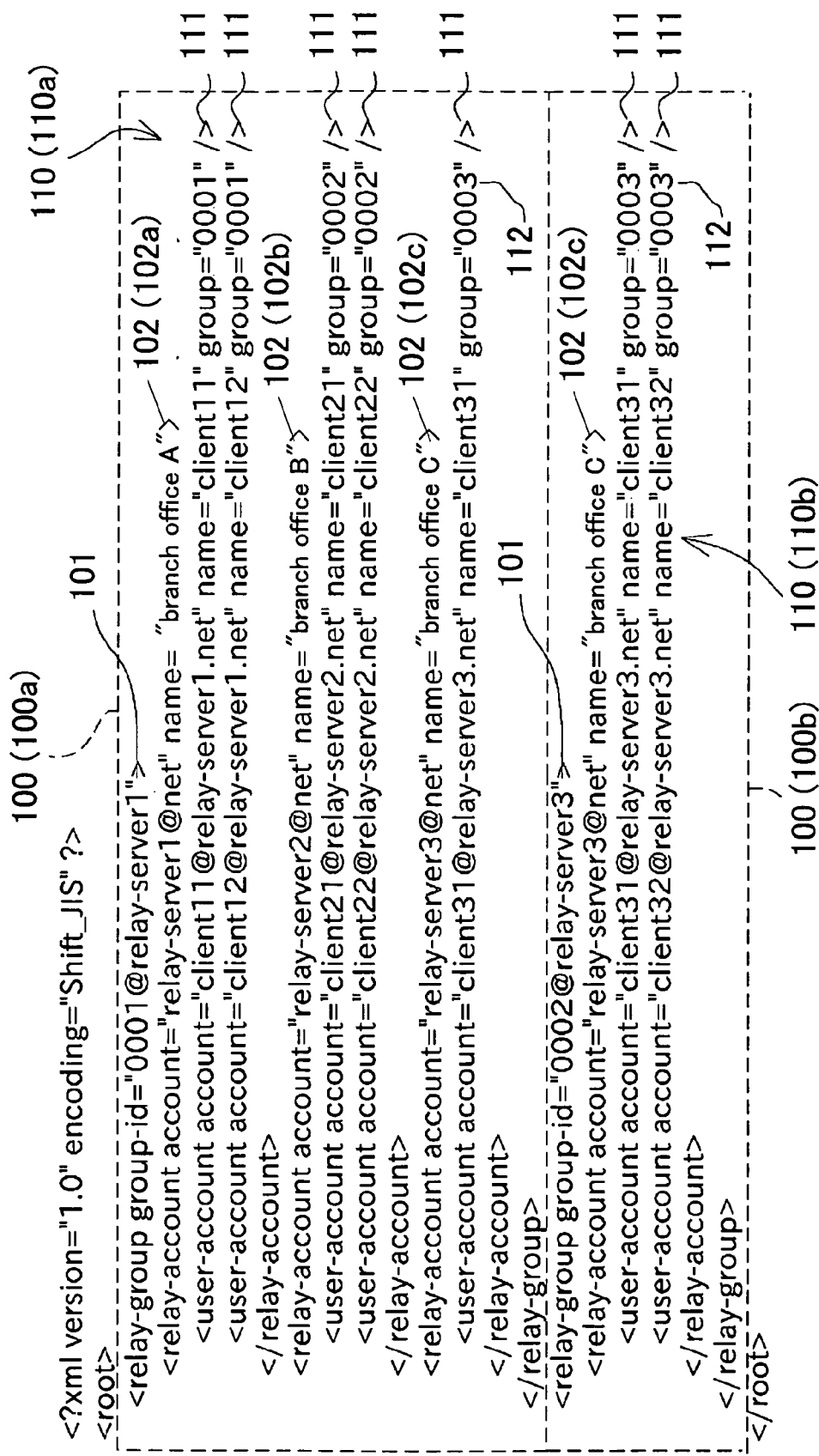
FIG. 6 illustrates a content of relay group information according to a preferred embodiment of the present invention.

FIG. 6 illustrates an example of the storage content of the relay group information database 505 of the relay server R3. In this example, the relay group information database 505 stores relay group information 100a and 100b.

Each of the relay group information 100a and 100b includes group identification information 101, information (relay account information) 102 (102a, 102b, 102c) of the relay server 1 that forms a relay group by enabling connection with one another, and resource sharable terminal information 110.

The group identification information 101 is used to identify the corresponding relay group information 100, and is given a different identification ID each time the relay group information 100 is created, so as to be uniquely identified. Thus, an operator (or the user) can specify the relay group based on the group identification information 101 and easily change a group configuration.

The relay account information 102 includes information about the account of each relay server 1 that forms a relay group by enabling a connection with one another. For example, in the relay group information 100a illustrated on an upper side of FIG. 6, the accounts of the relay servers R1, R2, and R3 that form a relay group are described. In the relay group information 100*b* illustrated on a lower side of FIG. 6, the account of the relay server R3 that forms another relay group is described.

A specific name that is given to the account of each relay server 1 is also registered in the relay account information 102 so as to allow the user to identify easily. For example, in the relay account information 102*a* of the relay server R1 (relay-server 1), a name (branch office A) is given to the account (relay-server1@net) of the relay server R1.

As described above, the relay group information 100*a* and 100*b* are created such that they can be uniquely identified with respect to each relay group. Each of the relay group information 100*a* and 100*b* includes the account (relay account information 102) of each relay server that defines a group (relay group) by enabling the connection with one another. Accordingly, by referring to the relay group information 100*a* and 100*b*, the operator or the user can recognize which LANs define a group.

The resource sharable terminal information 110 that can be included in the relay group information 100 will now be described.

As illustrated in FIG. 6, the resource sharable terminal information 110 is registered in association with each piece of relay group information 100. For example, resource sharable terminal information 110*a* is registered in association with the relay group information 100*a*, and resource sharable terminal information 110*b* is registered in association with the relay group information 100*b*.

Each of the resource sharable terminal information 110*a* and 110*b* includes individual terminal information 111 describing the client terminal 5 that can share the resource in the corresponding relay group of the relay group information 100*a* or 100*b*. The account of each client terminal 5 that can share the resource is described in the individual terminal information 111.

For example, the relay group information 100*a* corresponding to the resource sharable terminal information 110*a* illustrated on the upper side of FIG. 6 defines the relay group that is defined by the relay servers R1, R2, and R3. As illustrated in FIG. 1, the client terminals 11 and 12 are arranged in the LAN 91 to which the relay server R1 is connected. In the example of the resource sharable terminal information 110*a* illustrated on the upper side of FIG. 6, the two client terminals 11 and 12 are selected as the terminals that can share the resource in the relay group, and account information of each terminal 11, 12 is registered as the individual terminal information 111. Similarly, the client terminals 21 and 22 are selected as the resource sharable terminals in the LAN 92 to which the relay server R2 is connected. Although the client terminals 31 and 32 are arranged in the LAN 93 to which the relay server R3 is connected, in the present example, only the client terminal 31 is selected as the resource sharable terminal, and account information thereof is registered as the individual terminal information 111.

The relay group information 100*b* corresponding to the resource sharable terminal information 110*b* illustrated on the lower side of FIG. 6 defines the relay group defined by only the relay server R3. In the example of the resource sharable terminal information 110*b*, the two client terminals 31 and 32 are selected as the resource sharable terminals in the LAN 93 to which the relay server R3 is connected, and account information of each terminal 31, 32 is registered as the individual terminal information 111.

In addition to the account of each resource sharable terminal, a specific name given to the account is registered in the individual terminal information 111 so as to be easily identified by the user. For example, in the case of client terminal 11, a name (client 11) given to the account thereof (for example, client11@relay-server1.net) is described. Moreover, belonging identification data 112 indicating belonging of the resource sharable terminal, such as a sales division and a development division, is described in the individual terminal information 111.

In the resource sharable terminal information 110, each individual terminal information 111 is described in association with the relay account information 102 of the relay server connected to the LAN to which the resource sharable terminals are connected. For example, the individual terminal information 111 related to the client terminal 11 is described in association with the relay account information 102*a* of the relay server R1.

As illustrated in FIG. 6, the relay group information database 505 can store a plurality of relay group information 100 and a plurality of resource sharable terminal information 110. In both the resource sharable terminal information 110*a* and 110*b* of the two relay groups, the client terminal 31 is the resource sharable terminal, and the individual terminal information 111 thereof is described. Accordingly, one client terminal 5 can be selected as the resource sharable terminal in a plurality of relay groups, and the resource sharable terminal information 110 indicating that the one client terminal may be the resource sharable terminal in the plurality of relay groups can be stored in the relay group information database 505.

Each piece of relay group information 100 is exchanged between each relay server 1 that defines the relay group. For example, the relay group information 100*a* illustrated on the upper side of FIG. 6 is exchanged among the three relay servers R1, R2, and R3, and is stored in the relay group information database 505 of each relay server R1, R2, and R3. The relay group information 100*b* illustrated on the lower side of FIG. 6 is held only by the relay server R3, and is stored in the relay group information database 505 of the relay server R3.

The content of the shared resource information will now be described with reference to FIGS. 7 and 8. FIG. 7 illustrates an example of shared resource information 120 stored in the shared resource information database 604 of the client terminal 11. The same shared resource information 120 is also stored in the shared resource information database 506 of the relay server R1 connected to the same LAN to which the client terminal 11 is connected.

The shared resource information 120 includes account identification information 121 indicating that the information 120 is the shared resource information related to the client terminal 11, and individual shared resource information 122 related to the client terminal 11.

Since the shared resource information 120 is created with respect to each client terminal 5, the account identification information 121 is used to identify the created shared resource information 120.

The individual shared resource information 122 includes shared resource identification information 123, family account information 124, and family resource information 125, etc.

The shared resource identification information 123 is used to identify the individual shared resource information 122 thereof, and can be uniquely identified by being given a different ID each time the individual shared resource information 122 is created. The shared resource identification information 123 includes (1) an ID that is associated with the client terminal 5 that has made a request for creating the shared resource information 120 and (2) a name that is used to identify the ID easily. For example, the ID may be "20071001150032client11@relay-server1" or the like, and the name for easily performing the identification may be "workspace1", or the like.

Thus, the user etc. can specify the individual shared resource information 122 based on the shared resource identification information 123, and thus can edit the content of the individual shared resource information 122 easily.

FIG. 8 illustrates the detailed content of the family resource information 125 of FIG. 7. As illustrated in FIG. 8, the family resource information 125 includes collections of resource information 126 indicating resources such as, for example, files and folders held by the client terminal 5.

Each resource information 126 includes name information of a resource to be shared (i.e., a shared resource), account information of the client terminal 5 (owner client terminal) that can handle the resource, address information indicating the whereabouts of the resource, and status information of the resource.

A name of the shared resource is given to the resource when the resource is shared by a plurality of client terminals 5, and may be described as follows, for example: name="folderA". In the account information of the owner client terminal, an account for identifying the owner client terminal is described as follows, for example: owner="client11@relay-server1.net". An address indicating the whereabouts of the resource indicates the location in which the shared resource is actually stored in the resource storage unit 603 (or the file server 6), and may be described by using a full path as follows, for example: value="c:/folderA". The status information indicates the status of the resource, and is described as follows, for example: status="OK".

As illustrated in FIG. 8, the resource information 126 may indicate a folder or a file. In the example of FIG. 8, an Extensible Markup Language (XML) tag indicating the resource information 126 of a file is a child element of an XML tag indicating the resource information of a folder. For example, in family resource information 125a, the resource information 126 indicating the file "file00ZX.xls" is a child element of the resource information 126 indicating the folder "folderA" (a similar configuration is applied to family resource 125b and 125c).

As described above, hierarchical structure information 127 is described in the shared resource information 120 by using the relationship between a parent element and the child element of an XML according to the present preferred embodiment. Accordingly, a hierarchical structure of the shared resources including the files and folders is established (represented). By using the hierarchical structure of the resources, the files and folders (i.e., shared resources) can be shared in an organized state in accordance with the usage and purpose of the resources.

The family account information 124 of FIG. 7 includes collections of information of accounts (for example, client11@relay-server1.net) of the client terminals 5 that share the resources indicated in the family resource information 125.

In the example of family resource information 125a of FIG. 8, the owner client terminal is the client terminal 11. The client terminals (user client terminals) that can handle the resource indirectly via the owner client terminal 11 are the client terminals other than the owner client terminal 11 that are described in the family account information 124 of FIG. 7. That is, the client terminals 12, 21, 22, and 31 are the user client terminals in this example.

As illustrated in FIG. 8, a plurality of family resource information 125 can be described, and the owner client terminal described in each family resource information 125 may be different from one another. Accordingly, the relationship between the owner client terminal and the user client terminals is not fixed, and any client terminal described in the family account information 124 may be the owner client terminal. Therefore, when a plurality of resources is shared, each of the family resource information 125 may be stored in different client terminals 5 with respect to each shared resource. In the following description, the client terminal described in the family account information 124 may be referred to as a sharing member terminal.

Each of the client terminals 11, 12, 21, 22, and 31, which are the sharing member terminals in the example of FIG. 7, is connected to the LAN to which any of the relay servers R1, R2, and R3, which form the relay group described in the relay group information 100a of FIG. 6, is connected. In the resource sharable terminal information 110a of the relay group, each sharing member terminal corresponds to the client terminal that has the individual terminal information 111 thereof described as the resource sharable terminal.

Each sharing member terminal stores, in the shared resource information database 604, the shared resource information 120 including the individual shared resource information 122 having the above-described content.

With reference to sequence numbers 11 through 19 of FIG. 9, generation steps and registration steps of the relay group will be described. Processes of sequence numbers 11 through 19 of FIG. 9 are performed as initial settings of the network by the user and operator.

First, in the relay server R1, a method (createGroup method) for newly forming a relay group with the relay server R2 is executed by the operator. In the createGroup method, an account (relay-server2@net) of the relay server R2 with which the relay group is formed is specified.

Accordingly, the relay group information 100a is newly created in the relay server R1. At this time, an identification ID (0001@relay-server1) is given to the corresponding relay group information, and described in the group identification information 101.

Then, a message transmission command (MESSAGE method) is executed in the relay server R1, and a "group-info message" with respect to the relay server R2 is transmitted to the external server 2 (sequence number 11). The message includes the identification ID of the relay group information created in the "createGroup method", or the like.

An account (sip:relay-server2@net) of the relay server R2, which is a message transmission destination, is specified in the MESSAGE method. By referring to the relay server account information database 203, the external server 2 acquires the global IP address of the relay server R2, and relays the "group-info message" from the relay server R1 to the relay server R2. Having received the message, the relay server R2 returns an "OK" response to the relay server R1 via the external server 2.

As described above, the communication between each relay server 1 in the present preferred embodiment is performed via the external server 2, and the same is applied to the following description. Accordingly, in the following description, specific descriptions of the communication process performed via the external server 2 will be omitted.

Next, the relay server R1 transmits a message requesting transmission of server information (request-server-info message) to the relay server R2 (sequence number 12). Having received the message, the relay server R2 returns an "OK" response and information (server-info) related thereto to the relay server R1.

Conversely, the relay server R2 transmits a "request-server-info message" to the relay server R1 (sequence number 13), and the relay server R1 returns information (server-info) related thereto to the relay server R2.

Thus, by exchanging each of the server information, both the information related to the relay server R1 and the information related to the relay server R2 are described in the relay account information 102 of the relay group information 100, and are stored in the relay group information database 505 of each relay server R1 and R2.

Next, a method (addGroup method) in which the relay server R3 is newly added to the previously created relay group (i.e., the relay group defined by the relay servers R1 and R2) is performed in the relay server R2 by the operator. An account (relay-server3@net) of the relay server R3 to be added and the identification ID (0001@relay-server1) of the relay group to which the relay server R3 will be added are specified in the "addGroup method".

Then, the relay server R2 transmits a "group-info message" to the relay server R3 to be added (sequence number 14). The message includes the identification ID of the relay group specified in the "addGroup method", or the like. Having received the message, the relay server R3 returns an "OK" response to the relay server R2. Then, similarly to the descriptions in sequence numbers 12, 13, server information is exchanged between the relay servers R2 and R3 (sequence numbers 15, 16).

The relay server R2 transmits, to the relay server R1, an "update-group-info message" notifying that the relay server R3 has been added to the relay group (sequence number 17). Having received the message, the relay server R1 returns an "OK" response to the relay server R2. Then, the server information is exchanged between the relay servers R3 and R1 (sequence numbers 18, 19).

Thus, the relay group information 100 (i.e., information having the content of relay group information 100a of FIG. 6) indicating that the relay servers R1, R2, and R3 define the relay group is stored in the relay group information database 505 of each relay server R1, R2, and R3.

Although not illustrated in FIG. 9, the "createGroup method" is further executed in the relay server R3 without specifying the other relay servers that define the relay group. As a result, the relay group information 100b defined only by the relay server R3 is created, and an identification ID (0002@relay-server2) is given and stored in the relay group information database 505 of the relay server R3.

Next, with reference to sequence numbers 21 through 29 of FIG. 10, registration steps of the resource sharable terminals with respect to the relay group will be described.

In the relay server R1, a method (addTerminal method) in which the client terminal 11 is registered as the resource sharable terminal in the relay group defined by the relay servers R1, R2, and R3 is executed by the operator. The account of the client terminal 11 and the identification ID (0001@relay-server1) indicating the registration destination relay group are specified in the "addTerminal method".

When the "addTerminal method" is executed, the relay server R1 searches the relay group information database 505 thereof. Then, the relay server R1 adds the individual terminal information 111 of the client terminal 11 to the resource sharable terminal information 110 that corresponds to the relay group information of the specified identification ID.

Then, the relay server R1 immediately specifies the relay group information 100 from the storage content of the relay group information database 505 by using the identification ID, and searches for the relay servers 1 that define the relay group. As a result, it is determined from the relay group information 100a of FIG. 6 that the relay group is defined by the relay servers R1, R2, and R3.

Accordingly, the relay server R1 transmits, to the relay server R2, an "add-group-info message" requesting an addition of the resource sharable terminal to the relay group (sequence number 21). The message includes the account of the client terminal 11 to be added and the identification ID of the registration destination relay group, or the like. Having received the message, the relay server R2 adds the individual terminal information 111 of the client terminal 11 to the resource sharable terminal information 110 stored in the relay group information database 505, and then returns an "OK" response.

Then, the relay server R1 transmits a "group-info message" to the client terminal 11 (sequence number 22). The message includes the resource sharable terminal information 110 to which the individual terminal information 111 of the client 11 is added. Having received the message, the client terminal 11 then stores the content of the received resource sharable terminal information 110 in a suitable storage unit.

Subsequently, the relay server R1 also transmits, to the relay server R3, the "add-group-info message" requesting the addition of the resource sharable terminal to the relay group (sequence number 23). Having received the message, the relay server R3 adds the individual terminal information 111 of the client terminal 11 to the resource sharable terminal information 110 stored in the relay group information database 505, and then returns an "OK" response.

Thus, the individual terminal information 111 of the client terminal 11 is registered as the resource sharable terminal in the resource sharable terminal information 110 of the relay group information 100 stored in the relay group information database 505 of each relay server R1, R2, and R3.

Next, in the relay server R2, a method (addTerminal method) for specifying the identification ID of the relay group and registering the client terminal 21 as the resource sharable terminal is executed by the operator.

The relay server R2 searches the relay group information database 505 thereof, and adds the individual terminal information 111 of the client terminal 21 to the resource sharable terminal information 110 that corresponds to the relay group information specified by using the identification ID.

Then, the relay server R2 transmits, to the relay server R1, an "add-group-info message" requesting an addition of the resource sharable terminal to the relay group (sequence number 24). The message includes an account of the client terminal 21 to be added and the identification ID of the registration destination relay group, or the like.

Having received the message, the relay server R1 adds the individual terminal information 111 of the client terminal 21 to the resource sharable terminal information 110 stored in the relay group information database 505. Further, the relay server R1 transmits an "add-group-info message" to the client terminal 11, which is connected to the same LAN and has already been stored as the resource sharable terminal (sequence number 24.1). Having received the message, the client terminal 11 stores the individual terminal information 111 of the client terminal 21 in a suitable storage unit. Then, the client terminal 11 returns an "OK" response to the relay server R1. Having received the response, the relay server R1 returns an "OK" response to the relay server R2.

Furthermore, the relay server R2 transmits a "group-info message" to the client terminal 21 (sequence number 25). The message includes the resource sharable terminal information 110 to which the individual terminal information 111 of each client terminal 11 and 21 is added. Having received the message, the client terminal 21 stores the content of the received resource sharable terminal information 110 in a suitable storage unit.

Subsequently, the relay server R2 also transmits, to the relay server R3, the "add-group-info message" requesting the addition of the resource sharable terminal to the relay group (sequence number 26). Having received the message, the relay server R3 adds the individual terminal information 111 of the client terminal 21 to the resource sharable terminal information 110 stored in the relay group information database 505, and then returns an "OK" response.

Thus, the individual terminal information 111 of each client terminal 11 and 21 has been registered as the resource sharable terminal in the resource sharable terminal information 110 of the relay group information 100 stored in the relay group information database 505 of each relay server R1, R2, and R3.

Next, in the relay server R3, a method (addTerminal method) in which the identification ID of the relay group is specified, and the client terminal 31 is registered as the resource sharable terminal, is executed by the operator.

Then, the relay server R3 searches the relay group information database 505 thereof, and adds the individual terminal information 111 of the client terminal 31 to the resource sharable terminal information 110 related to the relay group specified by using the identification ID.

Further, the relay server R3 transmits, to the relay server R1, an "add-group-info message" requesting an addition of the resource sharable terminal to the relay group (sequence number 27). The message includes an account of the client terminal 31 to be added and the identification ID of the registration destination relay group, or the like.

Having received the message, the relay server R1 adds the individual terminal information 111 of the client terminal 31 to the resource sharable terminal information 110 stored in the relay group information database 505. Further, the relay server R1 transmits an "add-group-info message" to the client terminal 11, which is connected to the same LAN and has already been stored as the resource sharable terminal (sequence number 27.1). Having received the message, the client terminal 11 stores the individual terminal information 111 of the client terminal 31 in a suitable storage unit. Then, the client terminal 11 returns an "OK" response to the relay server R1. Having received the response, the relay server R1 returns an "OK" response to the relay server R3.

Then, the relay server R3 transmits a "group-info message" to the client terminal 31 (sequence number 28). The message includes the resource sharable terminal information 110 to which the individual terminal information 111 of the client terminal 31 is added. Having received the message, the client terminal 31 stores the content of the received resource sharable terminal information 110 in a suitable storage unit.

Then, the relay server R3 also transmits, to the relay server R2, the "add-group-info message" requesting the addition of the resource sharable terminal to the relay group (sequence number 29). Having received the message, the relay server R2 adds the individual terminal information 111 of the client terminal 31 to the resource sharable terminal information 110 stored in the relay group information database 505. Further, the relay server R2 transmits the "add-group-info message" to the client terminal 21, which is connected to the same LAN and has already been stored as the resource sharable terminal (sequence number 29.1). Having received the message, the client terminal 21 stores the individual terminal information 111 of the client terminal 31 in a suitable storage unit. Then, the client terminal 21 returns an "OK" response to the relay server R2. Having received the response, the relay server R2 returns an "OK" response to the relay server R3.

Thus, the individual terminal information 111 of each client terminal 11, 21, 31 as the resource sharable terminal is registered in the resource sharable terminal information 110 of the relay group information 100 stored in the relay group information database 505 of each relay server R1, R2, and R3.

Although not illustrated in FIG. 10, an operation for adding the client terminals 12 and 22 to the relay group information (having the identification ID "0001@relay-server1") is further performed. As a result, the individual terminal information 111 of each client terminal 11, 12, 21, 22, and 31 as the resource sharable terminal is registered in the resource sharable terminal information 110 of the relay group information 100 (refer to reference numeral 110a of FIG. 6). Furthermore, in the relay server R3, an operation for adding the client terminals 31 and 32 to another relay group information (having the identification ID "0002@relay-server2") is subsequently performed.

The process of registering the client terminals as the resource sharable terminals has been described in FIG. 10. The relay server 1 can also perform a process ("deleteTerminal method") of unregistering the client terminal 5 as the resource sharable terminal. In such a case, the individual terminal information 111 of the specified client terminal 5 is deleted from the resource sharable terminal information 110.

Next, with reference to FIG. 11, an operation for sharing the resource of the client terminal 5 will be described. Here, an example of sharing a folder "folderA" held by the client terminal 11 with the client terminals 12, 21, 22, and 31 in the relay group having the identification ID "0001@relay-server1" will be described.

The user specifies the relay group having the identification ID "0001@relay-server1" by operating the client terminal 11, and then instructs the client terminal 11 to display the resource sharable terminals of the relay group. The client terminal 11 acquires the information related to the resource sharable terminals by communicating with the relay server R1, and displays, on a screen, a list of resource sharable terminals of the specified relay group.

Since the relay group having the identification ID "0001@relay-server1" is specified, the client terminals 12, 21, 22, and 31 are displayed as the resource sharable terminals based on the resource sharable terminal information 110a illustrated on the upper side of FIG. 6. The user specifies all the displayed client terminals 12, 21, 22, 31 as the terminals (user client terminals) that will share the resource. Although all of the terminals are specified to share the resource in the present example, some of the terminals may be specified instead.

Accordingly, the client terminal 11 transmits a request (createSharedResource command) for creating a shared resource to the relay server R1 (sequence number 31 of FIG. 11). The message includes the identification ID of the relay group and the information related to the specified user client terminals 12, 21, 22, and 31.

Having received the message, the relay server R1 creates the shared resource information 120 to store in the shared resource information database 506 thereof. Further, by referring to the content of the relay group information database 505 based on the identification ID of the relay group, the relay server R1 transmits a "policy-data message" to the relay servers R2 and R3, which define the relay group, and notifies them of the created shared resource information 120 (sequence numbers 31.1 and 31.2). Furthermore, the relay server R1 transmits the "policy-data message" to the client terminal 12, which is the specified user client terminal and belongs to the relay server R1, to notify of the shared resource information 120 (sequence number 31.3).

Having received the message, each relay server R2 and R3 stores the shared resource information 120 in the corresponding shared resource information database 506. Moreover, each relay server R2 and R3 transmits the "policy-data message" to each of the specified user client terminals 21, 22, and 31, and notifies them of the shared resource information 120 (sequence numbers 31.1.1, 31.1.2, 31.2.1).

Having received the "policy-data message", each user client terminal 12, 21, 22, and 31 changes the shared resource information 120 stored in the corresponding shared resource information database 604, and then returns an "OK" response to the respective relay servers R1, R2, and R3, which are the transmission sources. Having received the "OK" response, the relay servers R2 and R3 return an "OK" response to the relay server R1. Having received the response, the relay server R1 returns an "OK" response to the client terminal 11.

Thus, the shared resource identification information 123 and the family account information 124 have been described in the shared resource information 120 stored in the shared resource information database 506 of each relay server R1, R2, and R3. The same content is described in the shared resource information 120 stored in the shared resource information database 604 of each client terminal 11, 12, 21, 22, and 31.

Then, the user operates the client terminal 11 to execute an "addResource method". Accordingly, a process of adding the resource information (reference numeral 126 of FIG. 8) indicating the shared resource to the shared resource information 120 is performed. In the present example, the "folderA" is selected from the resources stored in the resource storage unit 603 of the client terminal 11, and specified to be shared by the other client terminals 12, 21, 22, and 31.

Having received such specification, the client terminal 11 transmits, to the relay server R1, a shared resource change request (updateSharedResource command) including the specified information (sequence number 32). Having received the shared resource change request, the relay server R1 stores the changed shared resource information in the shared resource information database 506 thereof. Then, the relay server R1 transmits the "policy-data message" to the relay server R2, with which the user client terminals 21 and 22 are connected, and the relay server R3, with which the user client terminal 31 is connected, and notifies them of the changed shared resource information 120 (sequence numbers 32.1 and 32.2). Moreover, the relay server R1 transmits the "policy-data message" to the client terminal 12, which is the specified user client terminal and belongs to the relay server R1, to notify of the shared resource information 120 (sequence number 32.3).

Having received the message, each relay server R2 and R3 stores the shared resource information 120 in the corresponding shared resource information database 506. Moreover, each relay server R2 and R3 transmits the "policy-data message" to each of the specified user client terminals 21, 22, and 31, to notify of the shared resource information 120 (sequence numbers 32.1.1, 32.1.2, and 32.2.1).

Having received the "policy-data message", each user client terminal 12, 21, 22, and 31 changes the shared resource information 120 stored in the corresponding shared resource information database 604, and returns an "OK" response to the relay servers R1, R2, and R3, which are the transmission sources. Having received the "OK" response, the relay servers R2 and R3 return an "OK" response to the relay server R1. Having received the response, the relay server R1 returns an "OK" response to the client terminal 11.

In the above-described processes, the resource information 126 related to the "folderA" (refer to FIG. 8) is added to the shared resource information 120. Next, although a detailed description is omitted, as illustrated in FIG. 8, an operation for adding a file "file00ZX.xls" (owned by the client terminal 11) to the shared resource information 120 is performed. The parent-to-child relationship of an XML tag in which the resource information 126 related to the file "file00ZX.xls" is the child element of the resource information 126 related to the previously added folder "folderA" is described in the shared resource information 120, and thus, the hierarchical structure information 127 of the shared resources is established.

Further, a process of adding a folder ("folderB", etc.) and a file ("file00A.xls", etc.) of each client terminal to the shared resource information 120 is performed. As a result, the family resource information 125 having the hierarchical structure information 127 illustrated in FIG. 8 is described in the shared resource information 120.

Figure 12:
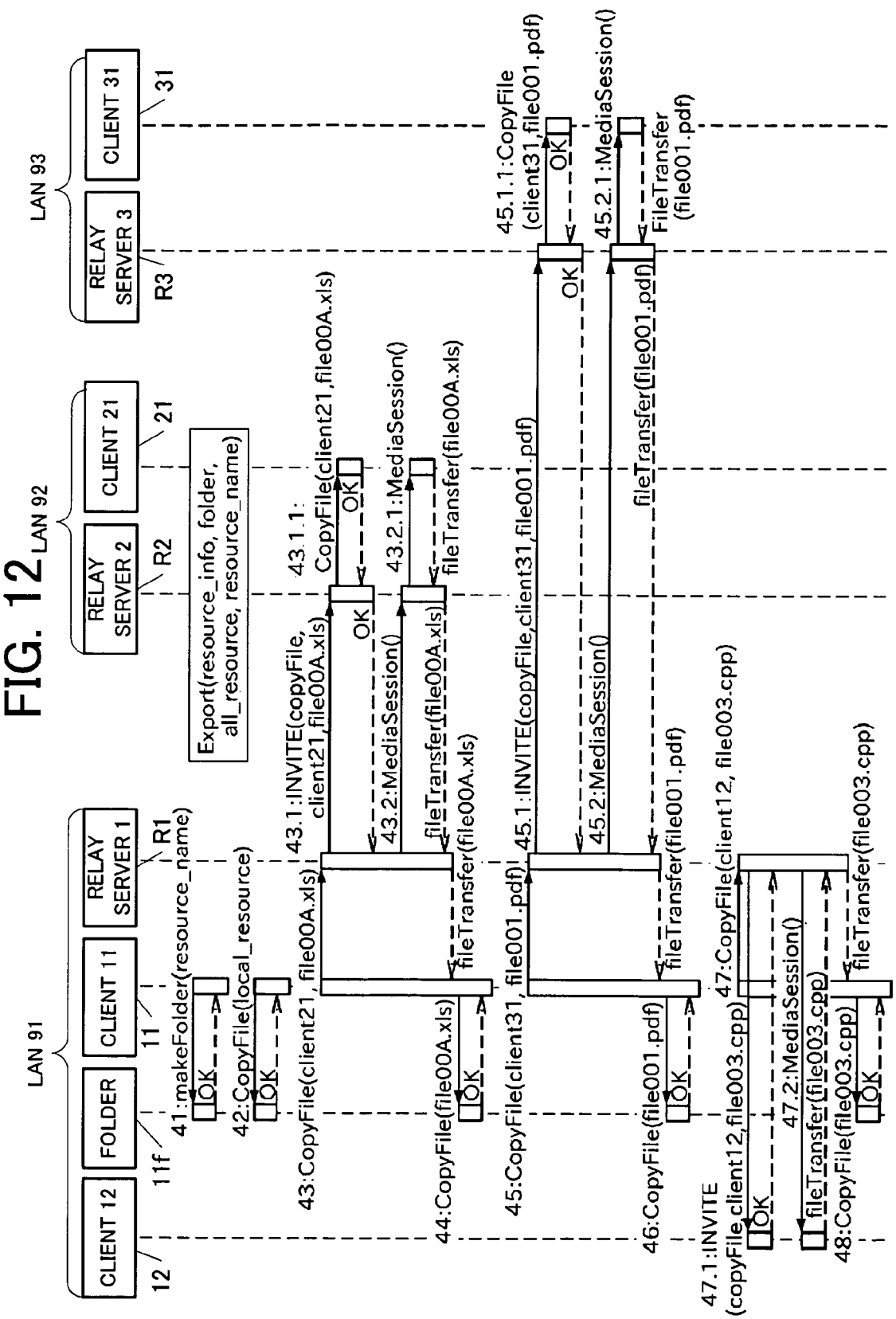
FIG. 12 is a sequence chart illustrating a process of collectively copying the shared resources to the client terminal by using a name used at the time of sharing according to a preferred embodiment of the present invention.

Next, with reference to sequence numbers 41 through 48 of FIG. 12, a process of collectively copying the shared resources to the client terminal 5 based on the registered shared resource information 120 (including the hierarchical structure information 127) will be described.

In the client terminal 11, an output command (Export method) for copying the shared resource on a local disk is executed by the user. In the output command, target shared resource information (resource_info) and an output destination folder (folder) are specified. In the output command, it is determined whether or not to include, in the shared resources to be output, the shared resource that can be handled by the client terminal 11, and also, either a shared name or an actual file name is specified as a resource name (file name) used at the time of output.

The user can specify any shared resource information, and in the present example, the shared resource information (FIG. 7) having the ID "20071001150032client11@relay-server1" is specified. Any folder created on the drive (local drive) of the resource storage unit 603 of the client terminal 11 or folder in the file server 6 may be specified as the output destination folder. In the present example, a folder "output" on the local drive is specified as the output destination folder. Further, it is specified to include, in the resources to be output, the shared resource that can be handled by the terminal 11, and it is also specified to use, as the resource name used at the time of output, the name used at the time of sharing. In the diagrams or charts 12 through 17, reference numeral 11*f* denotes the output destination folder specified through the client terminal 11.

When the Export command is executed, the client terminal 11 executes a command for creating a folder (makeFolder method), and creates a folder in the output destination folder 11*f* (the folder "output") (sequence number 41).

The folder to be created is determined based on the shared resource information 120 (the family resource information 125 of FIG. 8). In the present example, since it has been specified to output the resource with the name used at the time of sharing, the folderA, folderB, and folderC are created in the folder "output".

Then, the client terminal 11 executes a command for copying a file (CopyFile method) (sequence number 42). In the CopyFile method, the resource (local resource) that can be handled by the client terminal 11 is specified from the shared resources described in the family resource information 125 of FIG. 8, and copied to the output destination. In the present example, among the resources described in FIG. 8, the client terminal 11 owns the file "file00ZX.xls". Accordingly, the resource (i.e., "file00ZX.xls", which corresponds to "estimate.xls" stored in the file server 6) is copied to the "folderA" created at the output destination. The file name used at the time of copying is the shared name "file00ZX.xls".

Then, the client terminal 11 transmits, to the relay server R1, a request (CopyFile method) for copying by transfer a resource that cannot be handled by the client terminal 11 (sequence number 43). The copy request includes the information about the owner client terminal that can handle the target resource and the information about the target resource. In the present example, based on the family resource information 125b of FIG. 8, the client terminal 21 is specified as the owner client terminal, and the "file00A.xls" is specified as the target resource.

Having received the transfer instruction, the relay server R1 searches the relay group information 100 stored in the relay group information database 505 thereof. As a result, it is determined that the specified client terminal 21 belongs to the relay server R2. Accordingly, the relay server R1 transmits a connection request (INVITE method) to the relay server R2 (sequence number 43.1). Having received the connection request, the relay server R2 transmits the copy request (CopyFile method) to the client terminal 21 (sequence number 43.1.1). Having received the copy request, the client terminal 21 checks whether or not the target resource (i.e., "file00A.xls", which corresponds to "doc001.xls") can be handled by the client terminal 21, and returns an OK response to the relay server R2. Then, the relay server R2 returns an "OK" response to the relay server R1.

Having received the OK response, the relay server R1 transmits a MediaSession command to the relay server R2, thereby establishing a communication path between the relay servers R1 and R2 (sequence number 43.2). Having received the MediaSession command, the relay server R2 transmits the MediaSession command to the client terminal 21, thereby establishing a communication path between the relay server R2 and the client terminal 21 (sequence number 43.2.1). Then, the client terminal 21 copies the target resource (file00A.xls) from the resource storage unit 603, and transmits the resource to the relay server R2. The target resource is transferred from the relay server R2 to the relay server R1, and then transferred to the client terminal 11.

The client terminal 11 then executes the CopyFile method in order to store the received target resource (file00A.xls) in the "folderB" of the output destination folder 11f (sequence number 44). At this time, the file name to be stored is the name "file00A.xls", which is used at the time of sharing.

After specifying the client terminal 31 as the owner client terminal, and specifying the resource "file001.pdf" as the target resource, the client terminal 11 transmits a copy request (CopyFile method) again to the relay server R1 (sequence number 45). The description of the process (sequence numbers 45.1 through 45.2.1) performed in accordance with this command will be omitted since it is similar to the process of sequence numbers 43.1 through 43.2.1. The client terminal 31 transmits the target resource ("file001.pdf", which corresponds to "A0001.pdf") to the relay server R3. When the resource is transferred via the relay server R1 to the client terminal 11, the client terminal 11 executes a CopyFile method, and stores the resource (file001.pdf) in the folderC of the output destination folder 11f (sequence number 46). At this time, the file name to be stored will be the name used at the time of sharing (i.e., "file001.pdf").

Subsequently, after specifying the client terminal 12 as the owner client terminal, and specifying a file "file003.cpp" as the target resource, the client terminal 11 transmits a copy request (CopyFile method) to the relay server R1 (sequence number 47). Having received the transfer instruction, the relay server R1 searches the relay group information 100 stored in the relay group information database 505 thereof. As a result, it is determined that the instructed client terminal 12 belongs to the relay server R1. Accordingly, the relay server R1 transmits a connection request (INVITE method) to the client terminal 12 (sequence number 47.1). Having received the connection request, the client terminal 12 checks whether or not the target resource (i.e., "file003.cpp", which corresponds to "source.cpp") can be handled, and returns an OK response to the relay server R1.

Having received the OK response, the relay server R1 transmits a MediaSession command to the client terminal 12, thereby establishing a communication path between the relay server R1 and the client terminal 12 (sequence number 47.2). Then, the client terminal 12 copies the target resource (file003.cpp) from the resource storage unit 603, and transmits the resource to the relay server R2. The target resource is then transferred from the relay server R1 to the client terminal 11.

Then, the client terminal 11 executes a CopyFile method, and stores the received target resource (i.e., "file003.cpp") in the folderA of the output destination folder 11f (sequence number 48). At this time, the file name to be stored is the name used at the time of sharing (i.e., "file003.cpp"). In the above-described processes, the output command with respect to the shared resources is completed.

Figure 13:
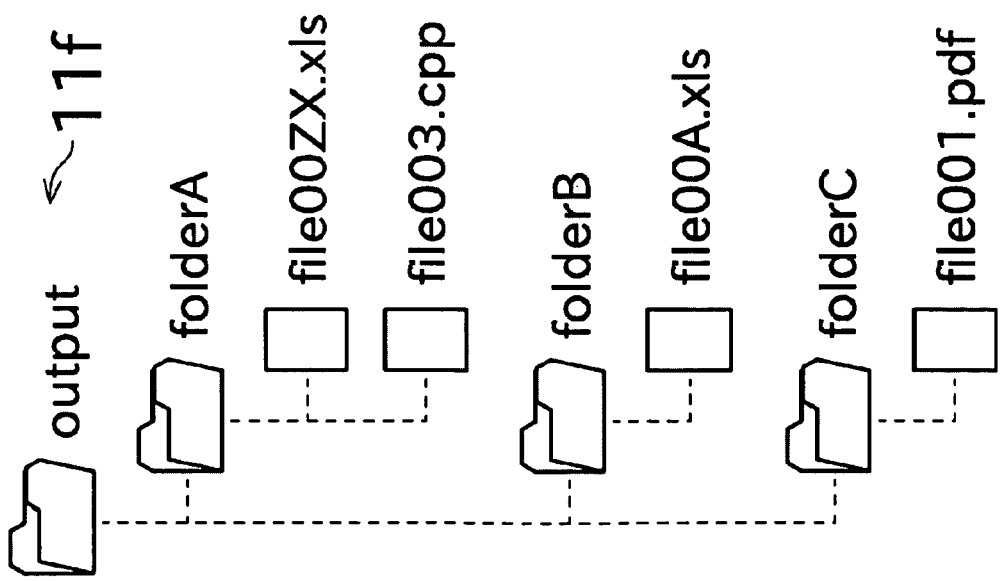
FIG. 13 illustrates an output result of the collective copying process of FIG. 12 according to another preferred embodiment of the present invention.

The storage content of the output destination folder 11f (i.e., the folder "output") after the above-described shared resource outputting processes are performed is illustrated in FIG. 13. The folderA, folderB, and folderC have been created in the output destination folder 11f, and the two files (shared resources) "file00ZX.xls" and "file003.cpp" have been output to the folderA. Moreover, the file "file00A.xls" has been output to the folderB, and the file "file001.pdf" has been output to the folderC. Thus, all of the shared resources in the resource information 126 have been output to the output destination folder 11f in accordance with the hierarchical structure information 127 (FIG. 8) described in the shared resource information 120.

Figure 14:
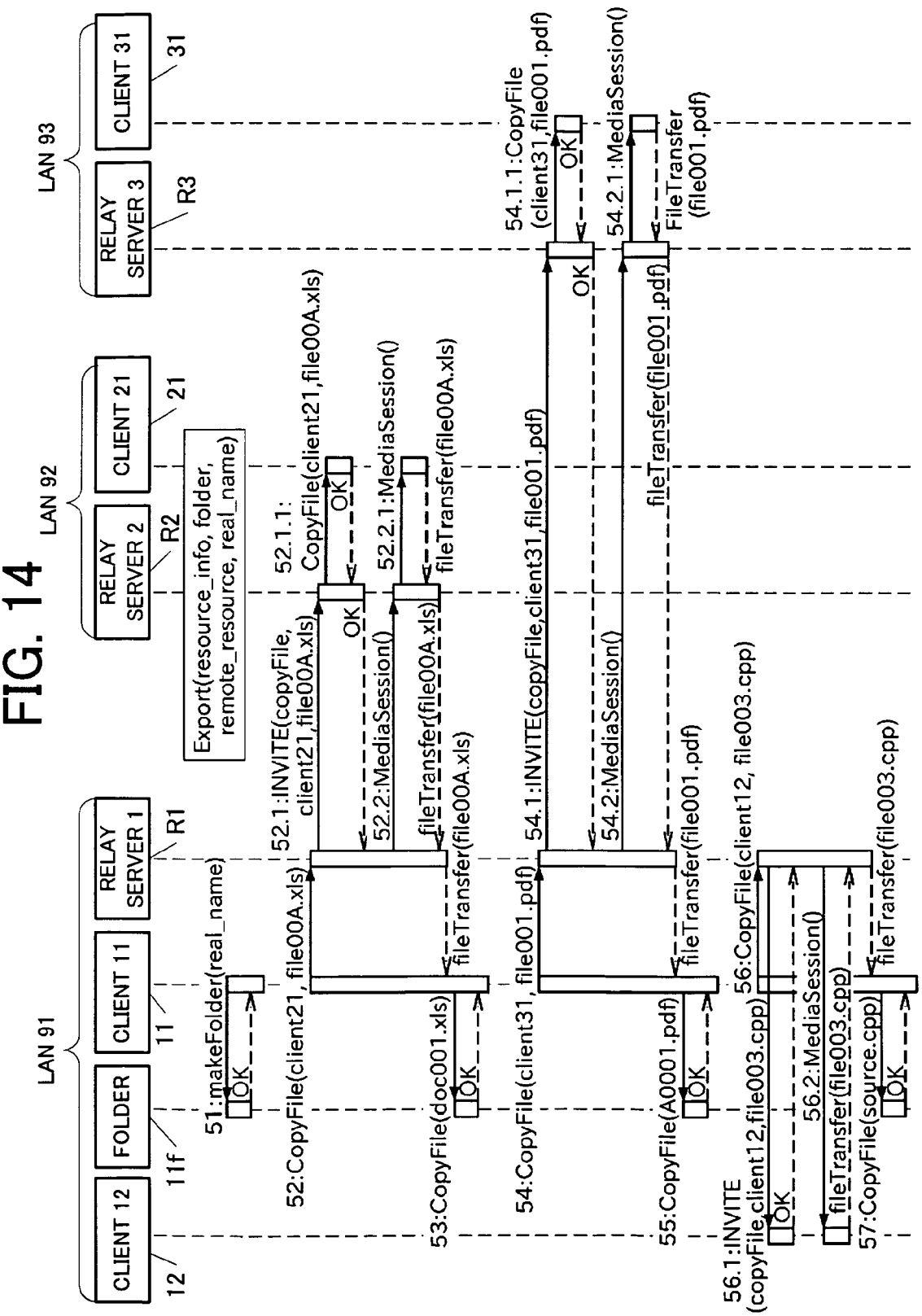
FIG. 14 is a sequence chart illustrating a process of collectively copying remote shared resources to the client terminal by using a name extracted from an actual resource name according to a preferred embodiment of the present invention.

Next, with reference to sequence numbers 51 through 57 of FIG. 14, a description will be made of a copying process implemented through an Export method performed when it is specified not to include, in the resources to be output, the shared resource that can be handled by the client terminal 11, and when it is specified to use the actual resource name as the resource name used at the time of output. Other conditions to be specified are similar to that of the case of FIG. 12.

After the above-described conditions are specified, the client terminal 11 executes the Export method. Accordingly, the client terminal 11 first executes a folder creation command in order to create the folderA, folderB, and folderC in the output destination folder 11f (the folder "output") (sequence number 51). Folder names of the folderA, folderB, and folderC have been extracted from the respective addresses (full pathnames) indicating the corresponding whereabouts. The process of copying the local resource (i.e., "file00ZX.xls") that can be handled by the client terminal 11 performed in sequence number 42 of FIG. 12 is not performed.

Next, in order to copy the resource ("file00A.xls"), which can be handled by the owner client terminal 21, the client terminal 11 transmits a copy request (CopyFile method) to the relay server R1 (sequence number 52). Since the processes in sequence numbers 52.1 through 52.2.1 are similar to the processes in sequence numbers 43.1 through 43.2.1 of FIG. 12, the description thereof will be omitted. Having received the target resource (i.e., "file00A.xls"), the client terminal 11 stores the resource in the folderB of the output destination folder 11*f* (sequence number 53). Unlike the case of FIG. 12, the file name to be stored is the file name "doc001.xls", which is extracted from the whereabouts (full pathname) of the file.

Subsequently, in order to copy the resource ("file001.pdf") that can be handled by the owner client terminal 31, the client terminal 11 transmits a copy request (CopyFile method) to the relay server R1 (sequence number 54). Since the processes in sequence numbers 54.1 through 54.2.1 are similar to the processes in sequence numbers 45.1 through 45.2.1 of FIG. 12, the description thereof will be omitted. Having received the target resource (i.e., "file001.pdf"), the client terminal 11 stores the resource in the folderC of the output destination folder 11*f* (sequence number 55). The file name to be stored is the file name "A0001.pdf", which is extracted from the whereabouts of the file.

Further, in order to copy the resource ("file003.cpp") that can be handled by the owner client terminal 12, the client terminal 11 transmits a copy request (CopyFile method) to the relay server R1 (sequence number 56). Since the processes in sequence numbers 56.1 through 56.2 are similar to the processes of sequence numbers 47.1 through 47.2, the description thereof will be omitted. Having received the target resource (i.e., "file003.cpp"), the client terminal 11 stores the resource in the folderA of the output destination folder 11*f* (sequence number 57). The file name to be stored is the file name "source.cpp", which is extracted from the whereabouts of the file.

Figure 15:
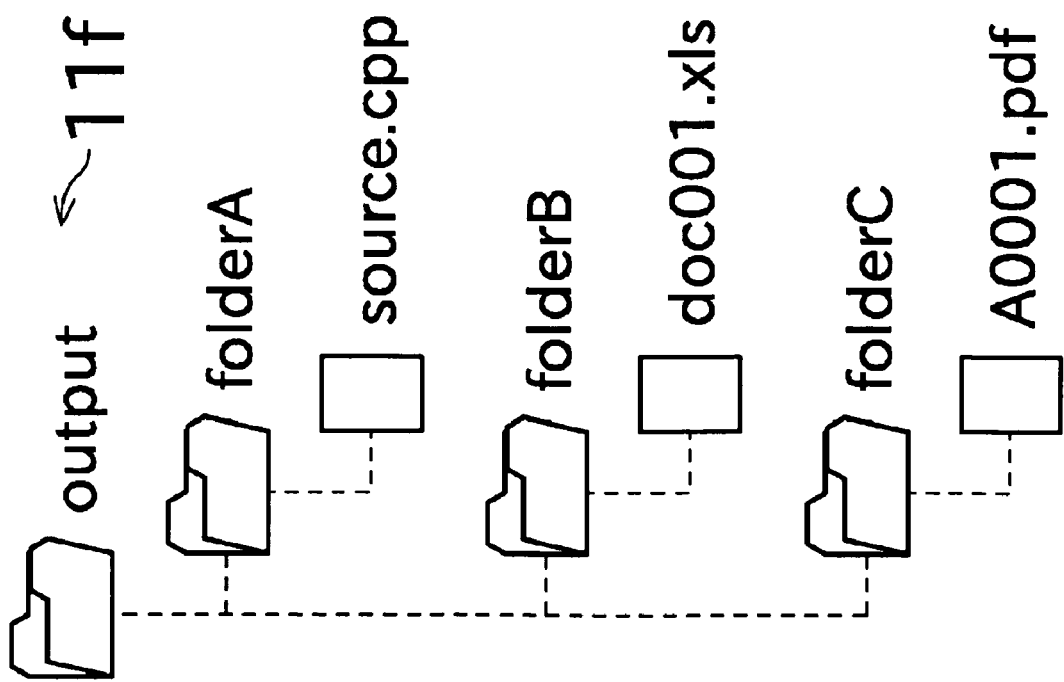
FIG. 15 illustrates an output result of the collective copying process of FIG. 14 according to a preferred embodiment of the present invention.

The storage content of the output destination folder 11*f* (i.e., the folder "output" of the client terminal 11) after the above-described shared resource outputting processes are performed is illustrated in FIG. 15. The folderA, folderB, and folderC are created in the output destination folder 11*f*, and the file "source.cpp" has been output to the folderA. Moreover, the file "doc001.xls" has been output to the folderB, and the file "A0001.pdf" has been output to the folderC. Thus, the shared resources, except for the resource that can be handled by the owner client terminal 11, have been output to the output destination folder 11*f* in accordance with the hierarchical structure information 127 (FIG. 8) described in the shared resource information 120. Unlike the case of FIG. 13, each of the shared resources is output under the file name that is extracted from the corresponding address information indicating the whereabouts in the owner client terminal.

Next, a detailed operation of the client terminal 5 will be described with reference to FIGS. 16 and 17, which are flow-charts illustrating the operation of the client terminal 5 performed in the relay communication system according to a preferred embodiment of the present invention.

Figure 16:
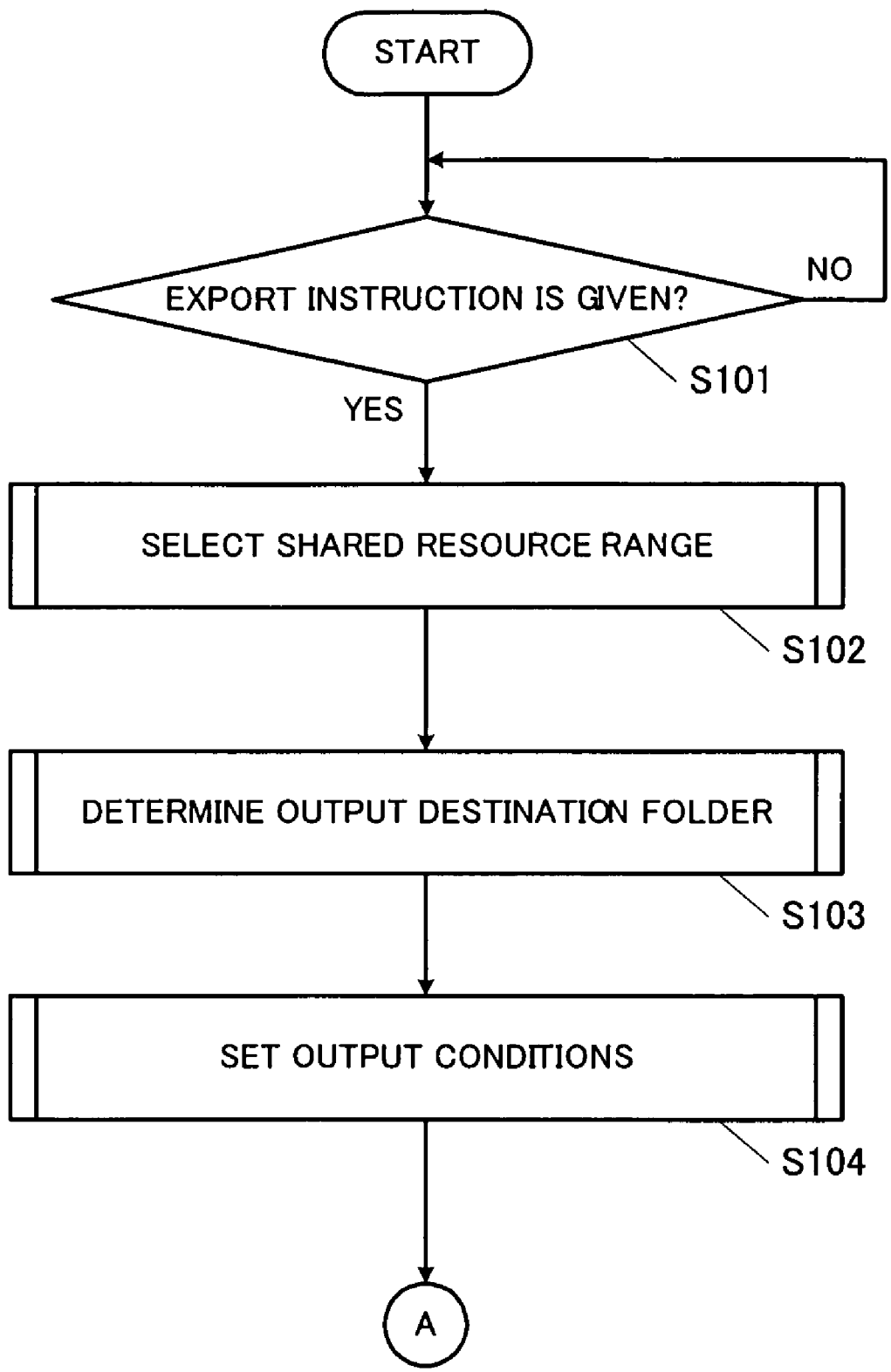
FIG. 16 is a flowchart illustrating the first half of a process of collectively copying the shared resources performed by the client terminal according to a preferred embodiment of the present invention.

As illustrated in FIG. 16, the client terminal 5 waits until an instruction (export instruction) for outputting the shared resource is issued (S101), and when the output instruction is issued, the client terminal 5 inquires of the user about a range of the shared resources to be output (S102). In response to the inquiry, the user specifies the desired shared resource information. At this time, the user can specify whether to output the entire hierarchical structure of the shared resources illustrated in FIG. 8, or to output only a portion (for example, only the files in the folderA) of the hierarchical structure.

Next, the client terminal 5 inquires about the output destination folder, and the user properly specifies the folder (S103). Further, the client terminal 5 inquires about the output conditions (S104). The output conditions include the condition as to whether or not to include, in the shared resources to be output, the shared resource (local resource) that can be handled by the client terminal 5 that is currently operated by the user. Furthermore, at the time of specifying the output conditions, the user can specify either the shared name or the actual resource name (i.e., the file (or folder) name extracted from the information indicating the whereabouts thereof) as the name to be used at the time of outputting the shared resource. The outputting operation performed by the user is completed in the above-described processes of S102 through S104.

Figure 17:
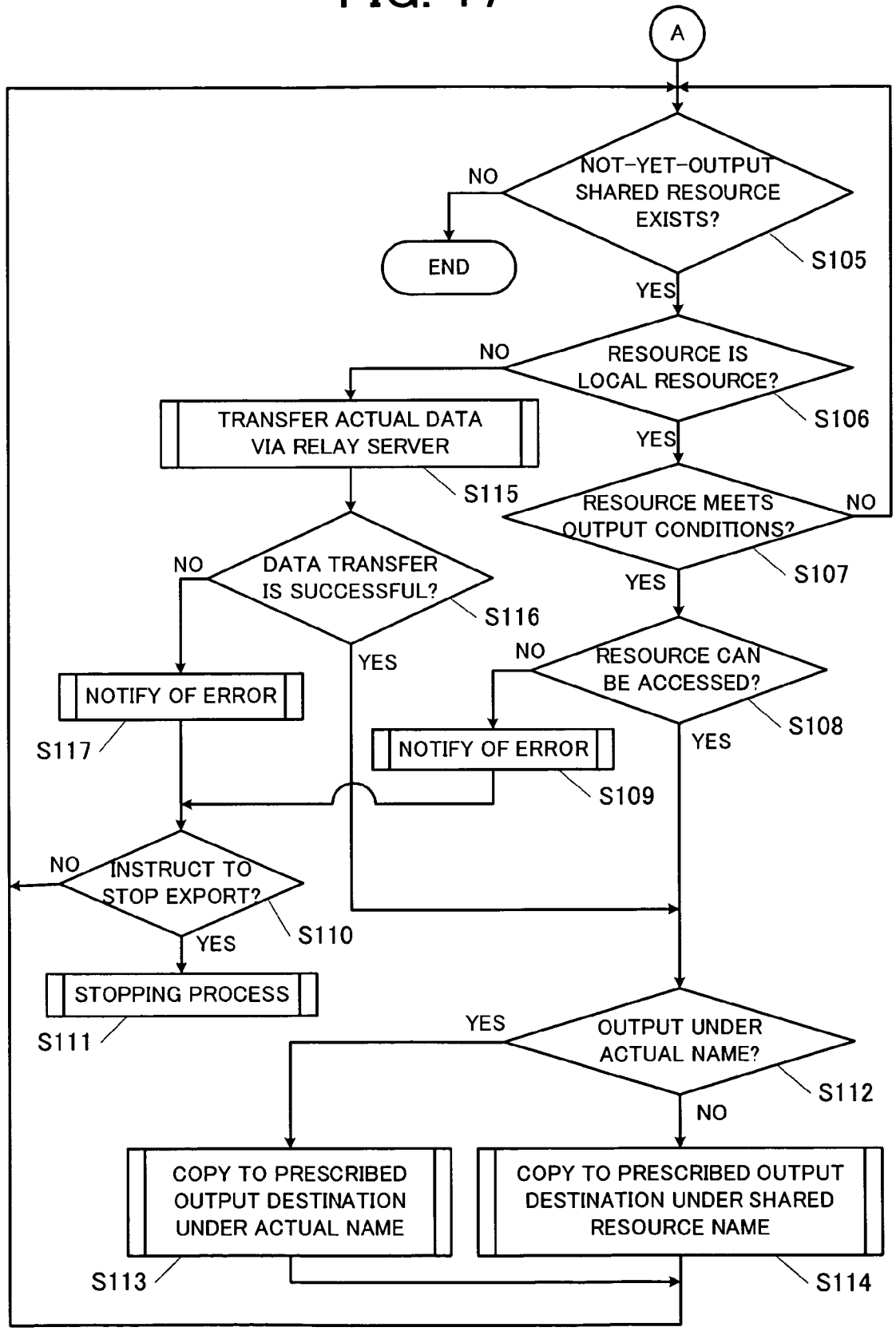
FIG. 17 is a flowchart illustrating the last half of the process of collectively copying the shared resources according to a preferred embodiment of the present invention.

Next, the client terminal 5 searches the shared resource information 120, and checks whether or not there remains any shared resource that is within the range of the shared resources specified in the process of S102 and that has not been output (S105 of FIG. 17). If there remains a shared resource that has not been output, it is checked, based on the shared resource information 120, whether or not the client terminal 5 that has been operated to output (i.e., the currently operated client terminal 5) owns the shared resource (in other words, whether or not the shared resource is the local resource) (S106).

When the owner of the shared resource is the currently operated client terminal 5, it is checked whether or not the instruction to include such local resource in the shared resources to be output has been given (S107). When the instruction not to include, in the resources to be output, the shared resource that can be handled by the currently operated client terminal 5 has been given, the process returns to S105, and proceeds to the process for the next shared resource.

When it is determined in S107 that the instruction to include the local resource in the resources to be output has been given, it is checked whether or not the shared resource can be accessed (S108). When the shared resource cannot be accessed, i.e., when the target file has been deleted or damaged, for example, the client terminal 5 notifies the user of such an error (S109). In response to the error notification, the user can specify, by operating the client terminal 5, whether to stop the outputting process or to continue the outputting process for the not-yet-output shared resources without stopping the process. Then, the client terminal 5 checks whether or not the stopping instruction has been given (S110), and when it is determined that such instruction has been given, the stopping process is performed (S111). When it is determined that such instruction has not been given, (i.e., when the instruction to output the not-yet-output shared resources has been given), the process returns to S105, and proceeds to the process for the next shared resource.

When it is determined in S108 that the shared resource can be accessed, in accordance with the instruction given in S104, it is checked whether or not the instruction to set the actual resource name as the name that is used at the time of outputting the shared resource has been given (S112). When the instruction to use the actual resource name has been given, the shared resource is copied under the actual resource name to the folder of the output destination (S113) On the other hand, if the instruction to output the resource under the shared name has been given, the shared resource is copied under the shared name to the folder of the output destination (S114). Regardless of the name used at the time of output, the location to which the shared resource is copied is determined in accordance with the output destination folder specified in S103 and with the hierarchical structure information 127. When the copying process is completed, the process returns to S105, and proceeds to the process for the next shared resource.

When it is determined in S106 that the shared resource is owned by another terminal other than the client terminal 5 (in other words, the shared resource is a remote resource), the shared resource is transferred from the owner client terminal via the relay server 1 (S115). Then, the client terminal 5 checks whether or not the data transfer of the target shared resource has been successful (S116). If the transfer has been successful, the transferred shared resource is copied to the folder of the output destination under the actual resource name or the shared name in accordance with the user's instruction, similarly to the processes performed with respect to the local resource (S112 through S114). When the transfer has been failed, the client terminal 5 notifies the user of the error (S117), and either performs the stopping process or proceeds to the process for the next shared resource in accordance with the user's instruction (S110 and S111).

In the client terminal 5, the above-described processes of S105 through S117 are repeated with respect to each shared resource included in the range of the shared resources specified by the user. When all the shared resources have been output, it is determined in S105 that there does not remain a not-yet-output shared resource, and the copying process is completed. Thus, by the user's simple operation, the shared resources can be collectively output to the specified output destination folder in accordance with the hierarchical structure information 127.

As described above, the relay server 1 of the present preferred embodiment includes the relay group information database 505, the shared resource information database 506, and the control unit 503. The relay group information database 505 is arranged to store the information (relay group information 100) about the relay group including the other relay servers that can be connected with the relay server. The shared resource information database 506 stores the shared resource information 120 when sharing the resource among the plurality of client terminals in the relay group. The shared resource information 120 includes the family resource information 125, which is the resource information, the hierarchical structure information 127 regarding the hierarchical structure of the resources, and the family account information 124, which is the account information of the resource sharing terminal (client terminal) having the resource. As illustrated in FIG. 12, when the client terminal 11 (the resource sharing terminal) executes the outputting operation for outputting the resource included in the prescribed shared resource information to the output destination in accordance with the hierarchical structure information 127, and when the shared resource information is specified, the control unit 503 of the relay server R1 transfers, to the client terminal 11, the resource that is included in the specified shared resource information 120 and that can be handled by the other resource sharing terminal (i.e., the client terminal 21 or 31).

Thus, when one client terminal (for example, the client terminal 11) desires to output the resources to the output destination, the resources are transferred to the client terminal 11 via the relay server R1, and can be collectively copied to the output destination in accordance with the hierarchical structure. Therefore, even when the resources are separately shared by the plurality of client terminals (i.e., the client terminals 12, 21, and 31), the resources can be easily copied via the network in an organized state in accordance with the hierarchical structure.

As illustrated in FIG. 8, in the present preferred embodiment, the shared resource information 120 (resource information 126) includes the information about the name of the resource to be shared (for example, "file003.cpp"), and the resource information (for example, "c:/project1/source.cpp"). In the outputting operation, the client terminal 11 can select whether to output the resource included in the specified shared resource information 120 by using the resource name ("file003.cpp") described in the shared resource information 120 as illustrated in FIG. 13 or by using the name ("source.cpp") extracted from the resource information as illustrated in FIG. 15.

Accordingly, since the name of the resource to be copied by the client terminal 11 can be selected, the user's various needs can be met.

In the present preferred embodiment, when the client terminal 11 outputs the resource included in the shared resource information 120, it can be selected whether to include, in the shared resources to be output, the resource ("file00ZX.xls") that can be handled by the client terminal 11 as illustrated in FIG. 13 or not to include such resource as illustrated in FIG. 15.

Thus, when the copying of the resource that can be handled by the client terminal 11 performing the outputting operation is not necessary, such case can be appropriately dealt with.

In the present preferred embodiment, when the user operates the client terminal 11, only a portion of the hierarchical structure of the hierarchical structure information 127 (for example, only the hierarchies that are below the folderA) can be specified in order to output the resource.

Thus, only a necessary portion of the hierarchical structure of the resources can be specified to be copied, and the copying of the resources via the network can be performed more easily.

Preferred embodiments of the present invention have been described, however, the above-described configuration may be modified in many various ways including the examples described below.

In the above-described preferred embodiments, the communication between each relay server 1 is preferably performed through the external server 2, which is a SIP server, however, in place of such a configuration, the communication may be directly performed between the relay servers 1 without through the external server 2.

As illustrated in FIG. 8, each of the shared resources is preferably described in the shared resource information 120 in the above-described preferred embodiments. Moreover, the hierarchical structure of the shared resources is represented by using the relationship between the parent element and the child element of the XML tag. However, the configuration is not limited to the above-described configuration, and the hierarchical structure information 127 may be represented by using other commonly-used methods, such as a method for describing link information about the parent-child relationship in order to associate each of the resource information 126.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A relay server comprising:
   a relay group information registration unit arranged to store relay group information about a relay group including other relay servers that can be connected with the relay server;
   a shared resource information registration unit arranged to store shared resource information including resource information, hierarchical structure information regarding a hierarchical structure of a resource, account information of a resource sharing terminal that is a client terminal that shares the resource, and account information of a resource sharing terminal that can handle the resource when the resource is shared by a plurality of client terminals in the relay group; and a control unit arranged to:
(i) create a hierarchical structure based on shared resource information specified by the resource sharing terminal;
(ii) establish, based on the relay group information, a communication path with another resource sharing terminal that is specified by the resource sharing terminal based on the shared resource information and that will operate the resource when the resource sharing terminal cannot operate the resource that is included in the specified shared resource information; and
(iii) receive the resource from the another resource sharing terminal and transfer the resource to the resource sharing terminal so as to output the transferred resource in accordance with the hierarchical structure when the specified shared resource information is specified by the resource sharing terminal such that the resource included in the prescribed shared resource information may be collectively output to an output destination in accordance with the hierarchical structure information.

2. The relay server according to claim 1, wherein
the shared resource information includes resource name information and the resource information; and
the resource sharing terminal is arranged to select whether to output the resource included in the specified shared resource information, by using a name of the resource described in the shared resource information or by using a name that is extracted from the resource information.

3. The relay server according to claim 1, wherein, when outputting the resource included in the specified shared resource information, the resource sharing terminal is arranged to select whether or not to include the resource that can be handled by the resource sharing terminal in the resource to be output.

4. The relay server according to claim 2, wherein, when outputting the resource included in the specified shared resource information, the resource sharing terminal is arranged to select whether or not to include the resource that can be handled by the resource sharing terminal in the resource to be output.

5. The relay server according to claim 1, wherein the resource sharing terminal is arranged to specify only a portion of the hierarchical structure described in the shared resource information, and then output the resource.

6. The relay server according to claim 2, wherein the resource sharing terminal is arranged to specify only a portion of the hierarchical structure described in the shared resource information, and then output the resource.

7. The relay server according to claim 3, wherein the resource sharing terminal is arranged to specify only a portion of the hierarchical structure described in the shared resource information, and then output the resource.

8. The relay server according to claim 4, wherein the resource sharing terminal is arranged to specify only a portion of the hierarchical structure described in the shared resource information, and then output the resource.

9. A relay communication system comprising:
a plurality of relay servers; and
a plurality of client terminals; wherein
each of the plurality of relay servers includes:
a relay group information registration unit arranged to store relay group information about a relay group having other relay servers that can be connected with the relay server;
a shared resource information registration unit arranged to store shared resource information having resource information, hierarchical structure information regarding a hierarchical structure of a resource, account information of a resource sharing terminal, which is a client terminal that shares the resource, and account information of a resource sharing terminal that can handle the resource when the resource is shared by the plurality of client terminals in the relay group; and
a control unit arranged to:
(i) create a hierarchical structure based on shared resource information specified by the resource sharing terminal;
(ii) establish, based on the relay group information, a communication path with another resource sharing terminal that is specified by the resource sharing terminal based on the shared resource information and that will operate the resource when the resource sharing terminal cannot operate the resource that is included in the specified shared resource information; and
(iii) receive the resource from the another resource sharing terminal and transfer the resource to the resource sharing terminal so as to output the transferred resource in accordance with the hierarchical structure when the specified shared resource information is specified by the resource sharing terminal such that the resource included in the prescribed shared resource information may be collectively output to an output destination in accordance with the hierarchical structure information.

10. The relay communication system according to claim 9, wherein
the shared resource information includes resource name information and the resource information; and
the resource sharing terminal is arranged to select whether to output the resource included in the specified shared resource information by using a name of the resource described in the shared resource information or by using a name that is extracted from the resource information.

11. The relay communication system according to claim 9, wherein when outputting the resource included in the specified shared resource information, the resource sharing terminal is arranged to select whether or not to include the resource that can be handled by the resource sharing terminal in the resource to be output.

12. The relay communication system according to claim 9, wherein the resource sharing terminal is arranged to specify only a portion of the hierarchical structure described in the shared resource information, and then output the resource.

* * * * *